(12) United States Patent
Pignatelli della Leonessa et al.

(10) Patent No.: US 12,456,314 B2
(45) Date of Patent: Oct. 28, 2025

(54) SYSTEMS, METHODS AND TECHNIQUES FOR ASCERTAINING OBJECT PROVENANCE AND/OR STATUS

(71) Applicant: Spacefarm LLC, New York, NY (US)

(72) Inventors: Federico Pignatelli della Leonessa, New York, NY (US); Rocchi Francesco, Ravenna (IT); Alberto Finadri, Castiglione Delle Stiviere (IT)

(73) Assignee: Spacefarm LLC, New York, NY (US)

( * ) Notice: Subject to any disclaimer, the term of this patent is extended or adjusted under 35 U.S.C. 154(b) by 0 days.

(21) Appl. No.: 19/063,075

(22) Filed: Feb. 25, 2025

(65) Prior Publication Data
US 2025/0272995 A1   Aug. 28, 2025

Related U.S. Application Data

(60) Provisional application No. 63/558,037, filed on Feb. 26, 2024.

(51) Int. Cl.
*G06V 20/66*    (2022.01)
*G06V 10/44*    (2022.01)
*G06V 10/56*    (2022.01)

(52) U.S. Cl.
CPC .............. *G06V 20/66* (2022.01); *G06V 10/44* (2022.01); *G06V 10/56* (2022.01)

(58) Field of Classification Search
CPC ......... G06V 20/66; G06V 10/44; G06V 10/56
USPC ....................................................... 382/190
See application file for complete search history.

(56) References Cited

U.S. PATENT DOCUMENTS

| 5,845,001 | A  | 12/1998 | Thomas |
| 6,017,218 | A  | 1/2000 | Bright |
| 8,930,302 | B2 | 1/2015 | Scholzen |
| 10,290,036 | B1 | 5/2019 | Gella et al. |

(Continued)

FOREIGN PATENT DOCUMENTS

| EP | 2 940 627 A1 | 11/2015 |
| WO | WO-01/82263 A1 | 11/2001 |
| WO | WO-2022/120008 | 6/2022 |

OTHER PUBLICATIONS

Albadarneh et al., "Machine Learning based Oil Painting Authentication an Features Extraction", Jan. 2017, https://www.researchgate.net/publication/346573516_%27Machine_Learning_based_Oil_Painting_Authentication_and_Features_Extraction.

(Continued)

*Primary Examiner* — Ali Bayat
(74) *Attorney, Agent, or Firm* — Foley & Lardner LLP

(57) ABSTRACT

Systems, devices, and methods are disclosed for determining provenance (e.g., origin, authenticity) for an object using digital image data of one or more objects. A system receives, via a network, first digital image data of an object. The system determines from the first digital image data, a first set of feature variables, each corresponding to a characteristic of the object. The system determines, via an artificial intelligence model and with input including the first set of feature variables and a comparison dataset, an origin for the object. The artificial intelligence model generates, based on the portion of first feature variables that match corresponding portions of the comparison dataset, an output indicative of an origin. The system communicates, via the network, an indication of the provenance of the object.

30 Claims, 12 Drawing Sheets

(56) References Cited

U.S. PATENT DOCUMENTS

| | | | |
|---|---|---|---|
| 10,546,213 | B2 | 1/2020 | Scholzen |
| 11,075,766 | B1 | 7/2021 | Norton et al. |
| 11,948,386 | B1 | 4/2024 | Francesco et al. |
| 12,087,073 | B1 | 9/2024 | Francesco et al. |
| 2008/0025555 | A1* | 1/2008 | Visan ............... G06V 30/19013 382/100 |
| 2010/0007930 | A1 | 1/2010 | Cowburn et al. |
| 2015/0034823 | A1 | 2/2015 | Akery |
| 2015/0127430 | A1 | 5/2015 | Hammer |
| 2015/0317344 | A1 | 11/2015 | Birdwell et al. |
| 2016/0034944 | A1 | 2/2016 | Raab et al. |
| 2019/0147301 | A1* | 5/2019 | Farfade ................. G06V 10/85 382/118 |
| 2019/0385003 | A1 | 12/2019 | Elgammal |
| 2020/0057769 | A1 | 2/2020 | Kass et al. |
| 2020/0104577 | A1* | 4/2020 | Uchida ............... G06V 40/166 |
| 2021/0117984 | A1* | 4/2021 | Sharma ............. G06Q 30/0185 |
| 2021/0224825 | A1* | 7/2021 | Ross ..................... G06V 10/44 |
| 2021/0374449 | A1 | 12/2021 | Mcconnell et al. |
| 2022/0012446 | A1 | 1/2022 | Dolmayan |
| 2022/0122276 | A1 | 4/2022 | Karam et al. |
| 2022/0130159 | A1 | 4/2022 | Le Henaff |
| 2022/0156349 | A1* | 5/2022 | Tsukada ............. G06V 40/107 |
| 2022/0198737 | A1 | 6/2022 | Enthed |
| 2022/0398330 | A1 | 12/2022 | Castinado et al. |
| 2023/0044309 | A1 | 2/2023 | Dodov et al. |
| 2023/0126839 | A1 | 4/2023 | Sarin |
| 2023/0385896 | A1* | 11/2023 | Gonta ................... G06N 3/094 |

OTHER PUBLICATIONS

International Search Report and Written Opinion dated May 6, 2025 for PCT/US2025/017250.

International Search Report and Written Opinion dated Nov. 15, 2024 for PCT/US2024/036571.

Karki et al., "A Novel Algorithm based on Contourlet Transform for Extracting Paint Features to Determine Drawing Style and Authorship", Mar. 2017, https://www.researchgate.net/publication/316835445_A_Novel_Algorithm_based_on_Contourlet_Transform_for_Extracting_Paint_Features_to_Determine_Drawing_Style_and_Authorship.

Kim et al., "Investigation of craquelure patterns in oil paintings using precise 3D morphological analysis for art authentication", https://www.researchgate.net/publication/362333733_Investigation_of_craquelure_patterns_in_oil_paintings_using_precise_3D_morphological_analysis_for_art_authentication.

Lyu et al., "A digital technique for art authentication", Jan. 2005, https://www.researchgate.net/publication/8162995_A_digital_technique_for_art_authentication.

Ostmeyer, et al. "Synthetic images aid the recognition of human-made art forgeries", arXiv:2312.14998v3, Feb. 15, 2024.

Schaerf et al, "Art authentication with vision transformers", S.I.: Visual Pattern Recognition and Extraction for Cultural Heritage, Neural Computing Applications, https://doi.org/10.1007/s00521-023-08864-8, Feb. 17, 2023.

* cited by examiner

SYSTEMS, METHODS AND TECHNIQUES FOR ASCERTAINING OBJECT PROVENANCE AND/OR STATUS

RELATED APPLICATIONS

This application claims priority to U.S. Provisional Patent Application No. 63/558,037, filed Feb. 26, 2024, the entire contents of which are incorporated herein by reference.

TECHNICAL FIELD

The present disclosure relates generally to ascertaining the provenance (e.g., origin and/or history, used interchangeably with "origin" for convenience) and the present status of one or more objects based on at least digital image data of the object and previously stored datasets of visual information about the object, and more specifically to systems and methods that can generate an indication of an origin and surface status of an object using artificial intelligence models and/or digital image data processing of one or more objects.

INTRODUCTION

Some of the most valuable assets in the world are collectibles and luxury items, such as coins, jewelry, gemstones, artwork, and other objects. As a result of their value, these types of objects are often the subject of unauthorized reproductions, elaborate forgeries, or one or more, potentially high-quality, counterfeit copies. For example, retailers large and small are struggling to combat the growing problem of counterfeit goods. Michigan State University conducted a 17-country study of Global Anti-Counterfeiting" and reported in 2023 that 68% of consumers were deceived into buying counterfeits at least once in the past year. Alhabash, S., Kononova, A., Huddleston, P. Moldagaliyeva, M., & Lee, H. (2023). Global Anti-Counterfeiting Consumer Survey 2023: A 17 Country Study. East Lansing, MI: Center for Anti-Counterfeiting and Product Protection, Michigan State University. https://a-capp.msu.edu/article/global-anti-counterfeiting-consumer-survey-2023/. Accordingly, before a proposed sale of a valuable object, the authenticity or origin of that object is often verified (or evaluated). In some instances, authenticity or origin of an object can be determined, for example, by an expert in object origins, history, and/or object authenticity. However, such experts may not exist for some types of objects. Further, even if expertise in a given type of object authenticity or object origin could be available, such expert is highly specialized and possess a skillset that requires many years of experience to develop. As a result, the cost associated with an expert analysis can be prohibitively high for a majority of objects on the market today, which possess substantial values and the corresponding risk of purchasing a forgery or counterfeit. Many objects may have sufficient value to create a need to verify the authenticity of their purported origin, but that value may also be insufficient to justify the cost of an expert analysis. For example, for many objects with a collector value (e.g., coins, stamps, etc.) currently on the market, the cost of an expert analysis may be more than the entire value of the object. Nevertheless, the objects worth less than the cost of a typical expert analysis may include many objects worth substantial amounts (e.g., several thousands of dollars or even tens of thousands of dollars).

Expert analysis may be inadequate in some instances, or may otherwise fall short. Experts are inevitably human and their work (or opinions) can be fallible. For example, as the potential value of an object increases, there can be greater tendency (or tension) that human factors come into play, such as relying on motivating factors (e.g., external influence, internal/external motivations), succumbing to prejudice, preference, bias, etc. And there is always a possibility that an expert can simply be wrong. While skill and experience can help to mitigate the human factor, additional methodologies and input for verifying, validating, and/or authenticating are desirable.

Another situation where expert analysis may fall short is when information is lacking, or where time constraints or cost considerations prevent obtaining all requisite and/or available information. Consider that the traceability of the location and/or ownership through the years may be unavailable. Lack of information can thwart even the most skilled and/or experienced expert.

Presently available technology to supplement, complement, or supplant expert analysis is presently prohibitively expensive. Sophisticated machines and processes provide additional information as to authenticity, but at a cost that generally is only justifiable for the most expensive of objects (e.g., greater than USD $250,000, or in some cases greater than USD $500,000).

Accordingly, there is a need for technology to verify provenance, an origin, and/or an authenticity of many objects more effectively and efficiently (e.g., at a cost that is lower than an average cost of an expert analysis (appraisal)) and/or that can verify a provenance, an authenticity, or an origin of an object with sufficient confidence for use in authenticating objects worth many thousands of dollars.

SUMMARY

The present disclosure provides at least a technical solution that is directed to determining a provenance and/or a present status of objects, such as determining authentication (or verification) information relating to an origin, source, and/or surface status of an object. The technical solution can be based on at least one or more images that depict the object (to be authenticated and/or for which the surface status is to be assessed) and one or more datasets with visual information that is based on image data for a plurality of separate objects.

BRIEF DESCRIPTION OF THE FIGURES

These and other aspects and features of the present implementations are depicted by way of example in the figures discussed herein. Present implementations can be directed to, but are not limited to, examples depicted in the figures discussed herein. Thus, this disclosure is not limited to any figure or portion thereof depicted or referenced herein, or any aspect described herein with respect to any figures depicted or referenced herein.

DETAILED DESCRIPTION

The present disclosure provides at least a technical solution directed to determining a provenance of objects (e.g., gemstones, coins, collectors cards, stamps, paintings, drawings, sculptures, luxury goods (e.g., accessories, clothing items), automobiles, watches, artisanal works, semi-artisanal works, etc.). The disclosed embodiments may provide authentication (or verification) of the origin or source (e.g., associated origin(s) and/or source(s)) of an object. The technical solution can be based on at least an image dataset that depicts the object to be authenticated and a comparison dataset that is based on image data for a plurality of separate objects.

The present disclosure provides at least a technical solution directed to determining a surface status of objects. In example embodiments, a surface status and conditioning report could indicate status changes and the condition of an object. Such embodiments could be used, for example, in applications such as car rentals or vault storage, where identifying differences, scratches, or changes in an object's surface are useful. Such functionality could be used, for example, in insurance disputes and the preservation of valuable items (such as vehicles).

Various embodiments of the disclosed approach may involve: data acquisition and digitization of high-quality images of an object, data extraction, and artificial intelligence (AI) training (see, e.g., image capture depicted in FIGS. 1A and 1B); data storage and archiving of the high-quality images following strict protocols; acquisition of new data from users and uploading of the new data (see, e.g., image capture depicted in FIG. 1C); and comparison of the user-submitted data with data stored in one or more archived datasets to verify the authenticity and/or status of the object.

Aspects of this technical solution are described herein with reference to the figures, which are illustrative examples of this technical solution. The figures and examples below are not meant to limit the scope of this technical solution to the present implementations or to a single implementation, and other implementations in accordance with present implementations are possible, for example, by way of interchange of some or all of the described or illustrated elements. Where certain elements of the present implementations can be partially or fully implemented using known components, only those portions of such known components that are necessary for an understanding of the present implementations are described, and detailed descriptions of other portions of such known components are omitted to not obscure the present implementations. Terms in the specification and claims are to be ascribed no uncommon or special meaning unless explicitly set forth herein. Further, this technical solution and the present implementations encompass present and future known equivalents to the known components referred to herein by way of description, illustration, or example.

Figure 1A:
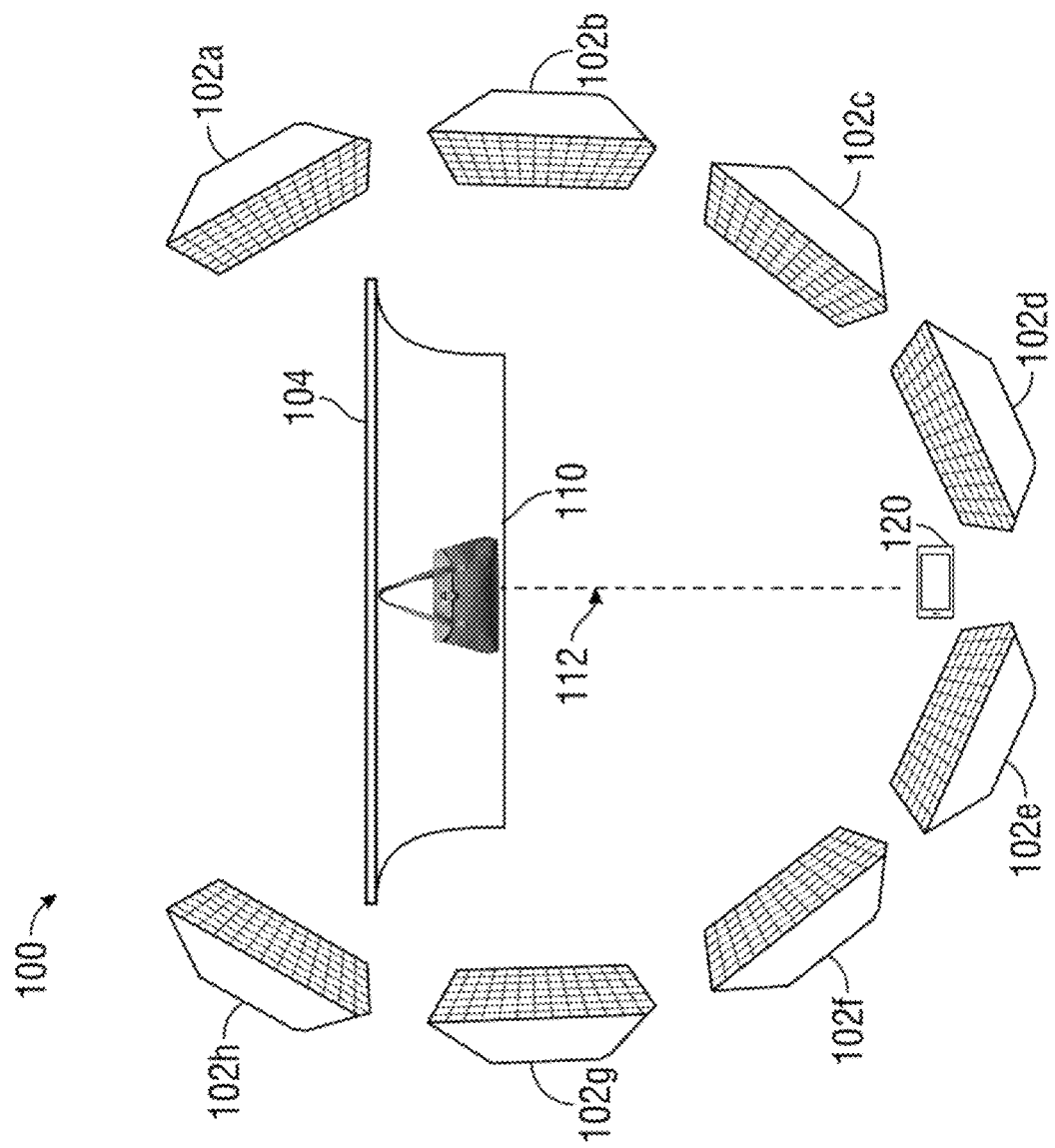
FIG. 1A is a diagram of a client device acquiring digital image data of an object at a first distance (e.g., for a data archive with comparison visual information), according to one embodiment of the present disclosure.

FIG. 1A is a diagram of an image data acquisition environment 100, according to one embodiment of the present disclosure, including a client device 120 configured to collect, at a first distance 112, digital image data of an object 110. As used herein, digital image data may be based on images, video, or a combination of images and video. The client device 120 is configured to capture a digital image dataset (e.g., a plurality of digital images and associated metadata) of the object 110 from a first distance 112. The digital image dataset (e.g., digital image data comprising first digital image data, second digital image data, third digital image data, fourth digital image data, etc. and associated metadata respectively) can be used for an authentication of, or the generation of a provenance score, an authenticity score, or origin score for, the object 110. In an aspect, the digital image dataset can be used for an determining an origin of the object 110.

In some embodiments, the client device 120 comprises a digital imaging device (e.g., a CMOS or CCD image sensor of a digital imaging device, including the digital camera of a smartphone or other mobile device, a full frame digital camera (e.g., a Digital Single-Lens Reflex ("DSLR") camera) and the like) capable of acquiring digital image data that adheres to one or more minimum specifications of acceptable digital image data. Stated differently, the client device 120 may adhere to one or more minimum specification of an acceptable digital imaging device (e.g., minimum specifications of the client device 120).

For example, the client device 120 can, in some embodiments, include any full frame digital camera, or digital imaging device, configured to output digital image data in a raw image file format and with at least an image resolution of 30 megapixels (e.g., a minimum of 30 megapixels, a minimum number of pixels-per-inch of the digital images output by the client device, a minimum size of the pixels of the client device's image sensor, etc.), but is not limited thereto (e.g., the client device 120 can include digital image devices with less than 30 megapixel imaging resolution, such as 15 megapixel image resolution). Alternatively, in some embodiments, the client device 120 can include a full frame digital camera and one or more computer(s) coupled to the digital camera to receive the digital image data that it collects. Thus, the client device 120 need not be limited to a digital camera (e.g., the camera shown in FIGS. 1A and 1B) and it can include, in some embodiments, one or more processors (e.g., a desktop computer, laptop, smartphone, tablet, etc.) coupled to a digital camera (e.g., configured to receive the digital image data collected by the digital camera) and capable of communicating the digital image data collected by the digital camera to a server (e.g., the server 210 of FIG. 2) via a communications network (e.g., communications network 201 of FIG. 2).

As another example, in some embodiments the digital imaging device may be integrated with or operable in conjunction with a magnification device, such as a microscope. (See FIGS. 8A and 8B.)

In some embodiments, the client device 120 can be configured to capture digital image data (e.g., image data of the object 110) in a raw digital image file format. and associated metadata. For example, the client device 120 can output raw digital image files (e.g., raw digital image data) with associated metadata that can include one or more of the following: output resolution, sensor metadata (e.g., the size of the digital sensor, the attributes of the sensor's Color Filter Array ("CFA") and its color profile, etc.), image metadata (e.g., the exposure settings, camera model, lens model, etc.), the date and location of the shot/image, user information, and any other information to accurately (e.g., correctly) interpret the digital image data collected by the client device 120. Additionally, in some embodiments, the associated metadata of the digital image data (e.g., metadata of raw digital image files) output by the client device 120 can indicate, or can be used by the systems and methods of the present disclosure to determine that, the digital image data is the original (e.g., unmodified) data as it was collected by the image sensor of the client device 120. Thus, in some embodiments, the metadata associated with the digital image data collected by the client device 120 can be used to verify that the corresponding digital images have not been modified, altered, or otherwise changed from the image data collected by the image sensor of the client device 120.

In some embodiments, the client device 120 can include a physical support structure (not shown), including, for example, a tripod, gimble, adjustable stand, or other suitable support structure that can be configured to retain the client device 120 in a fixed position relative to the object 110. For example, the client device 120 can be disposed on a tripod that is configured to retain the client device 120 at the first distance 112 relative to the object 110 and with the object 110 disposed with a fixed position within the field of view for the client device 120 (e.g., configured to keep object 110 at the position with the FOV for the client device 120 set by a user of the client device 120). In some embodiments, the client device 120 can be configured on a mechanized support structure, which is configured to position the client device 120 relative to the object 110 (e.g., according to one or more positioning sensors configured to allow the mechanized support to determine the position of the client device 120 relative to the object 110) and automatically collect the image data of the object 110 at a variety of distances (e.g., the first distance 112 and the second distance 114, shown in FIG. 1B) and for on a variety of different regions of the object 110 (e.g., a foreground, a background, a subject, one or more quadrants, and the like).

The client device 120 can acquire digital image data or any portion thereof. For example, the client device 120 need not acquire all of the digital image data and, in some examples, the digital image data may be acquired by a plurality of different client devices. The digital image data (e.g., acquired by any number of client devices) can comprise one or more separate digital images of the object 110 viewed at the first distance 112. Accordingly, the present disclosure is not limited to digital image data acquired by a single client device or that is otherwise associated with (e.g., provided by, received from, etc.) any particular number of different sources of the image data. Examples of the present disclosure, therefore, can include any number of client devices (e.g., three different client devices that are each at separate locations (e.g., in different states) and that may individually, or relative to each other, acquire image data at any number of different times (e.g., acquire image data on, or over, different times, days, months, and years).

The one or more digital images of the object 110 may comprise, for example, an image of the entire object 110 (e.g., an entire surface of a luxury good, gemstone, a surface of a coin, an image surface of a stamp, an entire canvas, a painting with its frame, an entire sculpture, etc.) with a minimum border of space between the object and the edges (e.g., frame) of the digital image. In different example embodiments, the image may include the entire surface of the object, a majority of the surface of the object, or representative portions or segments of the object. The entire surface may be used if, for example, the overall dimensions (length, height, width, volume, etc.) of the object or the consistency or variation in certain features across the surface are to be considered, whereas less than the entire surface may be used if, for example, the features to be considered are available in the portion(s) captured in the image(s). In some examples of the present disclosure, the object 110 can be one or more different types of valuable objects and need not be limited to creative works such as paintings and sculptures. For example, in some embodiments, the object 110 can include any of the following, non-limiting and non-exhaustive, examples: a gemstone, jewelry, one or more luxury goods (e.g., handbags, wallets, shoes, boots, items of clothing such as dresses, and accessories such as belts, watches, etc.), one or more collectable stamps or other printed media (e.g., baseball cards, etc.), one or more coins (e.g., collector's coins), one or more precious metals, photographic prints, among other examples.

For example, in some embodiments, the present disclosure may be used to recognize, certify, and authenticate one or more luxury products (e.g., purses, handbags, shoes, clothing, jewelry, etc.) and may provide, based on manufacturing features, design features, or product composition features, an individualized 'fingerprint' or dataset to identify copies of a particular luxury product. As another example, the present disclosure can be used for quality assurance of pharmaceutical products. As another example, the present disclosure can be used for quality assurance of a manufacturing process, more generally. The present disclosure can confirm an object's compliance with one or more manufacturing quality standards and/or determine a product's authenticity at any step within the product's supply chain. Additionally, the present disclosure may, in some examples, be used to determine quality of edible goods, determine authenticity of physical currency and other physical financial instruments, satellite imagery analyses, spatial imagery analyses, and medical imagery analyses.

The digital image data captured by the client device 120 at the first distance 112, can include an image of the object 110 that is a complete image that includes all of the object 110 in a single image without any portion of the object 110 'touching' (e.g., coming into contact with) any of the edges of the digital image or a specified margin around the perimeter of the digital image. Additionally, the one or more digital images of the object 110 at the first distance 112 can include one or more additional images of the object 110 at the first distance 112 (e.g., one or more images of a feature, edge, detail, or other portion of the object 110).

Accordingly, in some embodiments, the first distance 112 may be a distance that is determined, in part, by the physical dimensions of the object 110 (e.g., to enable the client device 120 to capture the entire object 110 in a single image). For example, a first distance 112 may be a shortest distance between the client device 120 and the object 110 at which the client device 120 can capture a correctly framed (e.g., within specified minimum margins) digital image of the object 110. Alternatively, in some embodiments, the first distance 112, may be determined, in part, according to a specified minimum threshold distance between the client device 120 and the object 120 (e.g., shortest distance, above a minimum distance, that produces a fully framed image of the object 110).

In some embodiments, the data acquisition environment 100 can include one or more lighting systems 102a-102f configured to illuminate the object 110 and enable the client device 120 to collect accurate image data of the object 110. In some embodiments, a backdrop 104 may also facilitate collections of image data of the object 110.

Figure 1B:
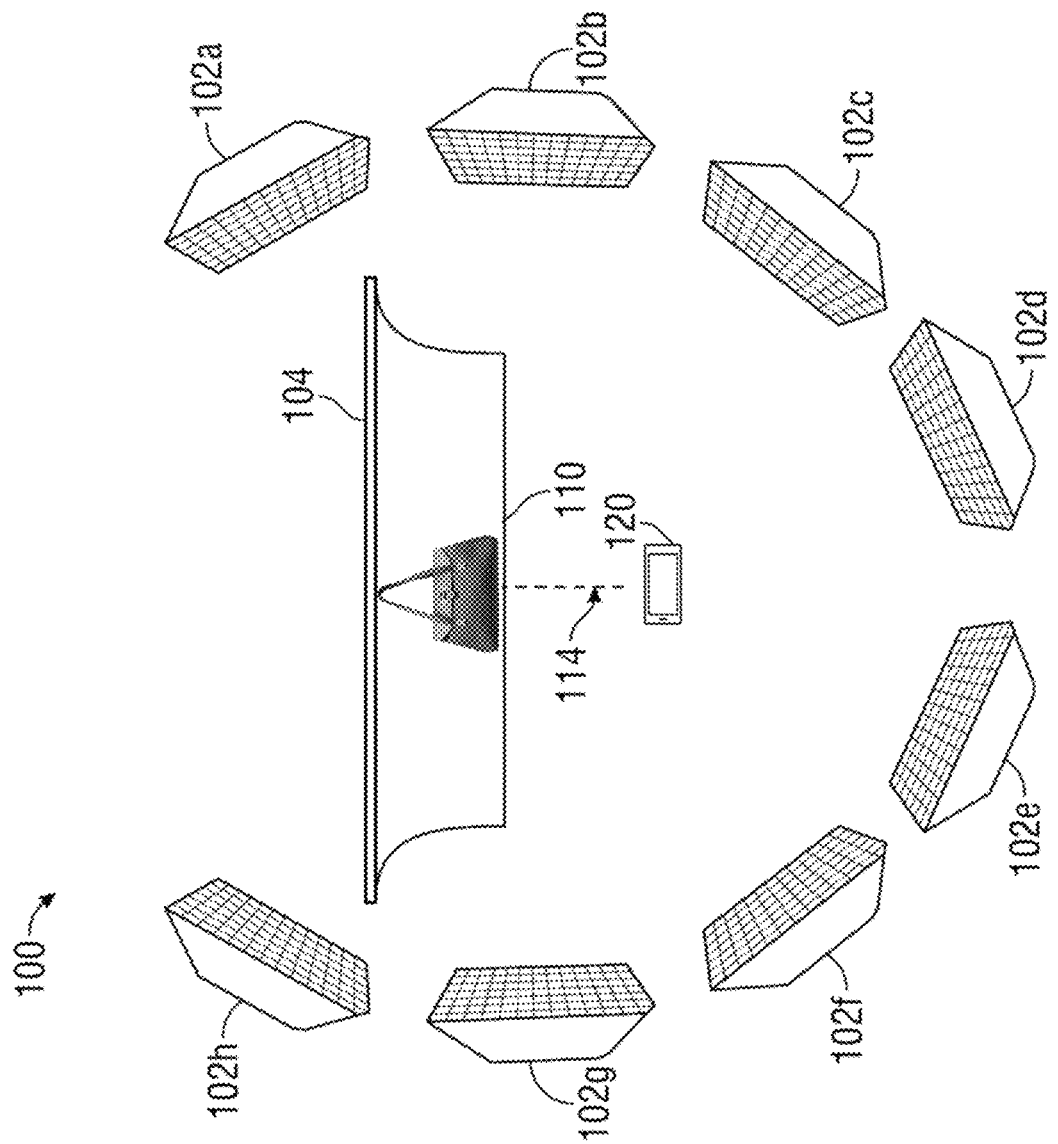
FIG. 1B is a diagram of a client device acquiring digital image data of an object at a second distance (e.g., for a data archive with comparison visual information), according to one embodiment of the present disclosure.

FIG. 1B is a diagram of the client device 120 configured to acquire digital image data of the object 110 at a second distance 114, according to one embodiment of the present disclosure. The client device 120 can acquire digital image data that comprises a plurality of digital images of the object 110 at the second distance 114. For example, in some embodiments, the client device 120 can be positioned at the second distance 114 to output digital images of only specific portions (e.g., less than the entirety) of the object 110. For example, at the second distance 114, the client device 120 can collect one or more digital images of specific regions of the object 110 (e.g., image data of the object 110 divided into a single quadrant, or fourth, in each individual image, image data collected by dividing the object into 6, 9, 12, or more sections, etc.). In some embodiments, the client device 120 can collect image data based on a specified physical size (e.g., images that are 1×1 inches, 3×3 inches, etc.) and based on different features, details, edges, properties, or other portions that may exist within the object 110, including, for example, collecting digital images of an edge region, a center region, a detail region, a damage region, a rear surface region, an inclusion region, and the like. In some embodiments, the client device 120 may be substituted with a different client device (e.g., a similar or substantially identical client device to the client device 120, as may allow for ease and convenience of not moving the client device 120 between different distances from the object).

In some embodiments, for example, the client device 120 may capture image data of the object comprising at least the following: at least two digital images of the entire object at a first distance 112; at least two digital images of the object, each collected at a second distance 114, less than the first distance 112, and with the client device 120 positioned directly in front of the detail of the object to be captured in the digital image(s); at least two closeup detail images, each image capturing separate details of the object, the client device 120 positioned directly in front of the detail(s) to be imaged, and collected at a third distance that is less than the second distance 114 (e.g., at a third distance that is between 5 and 15 centimeters, at a third distance that is between 1 and 5 centimeters, or at a third distance that is between 0.01 and 0.1 centimeters, etc.); at least one image of the entire backside of the object (e.g., digital image 602, shown in FIG. 6); at least one backside detail image (e.g., support image data 604, shown in FIG. 6), and at least two images of separate details with the client device 120 positioned at a 45 degree angle relative to a surface of the object 110 (e.g., with the imaging device angled 45 degrees from the edge of a planar surface of a gemstone).

Figure 1C:
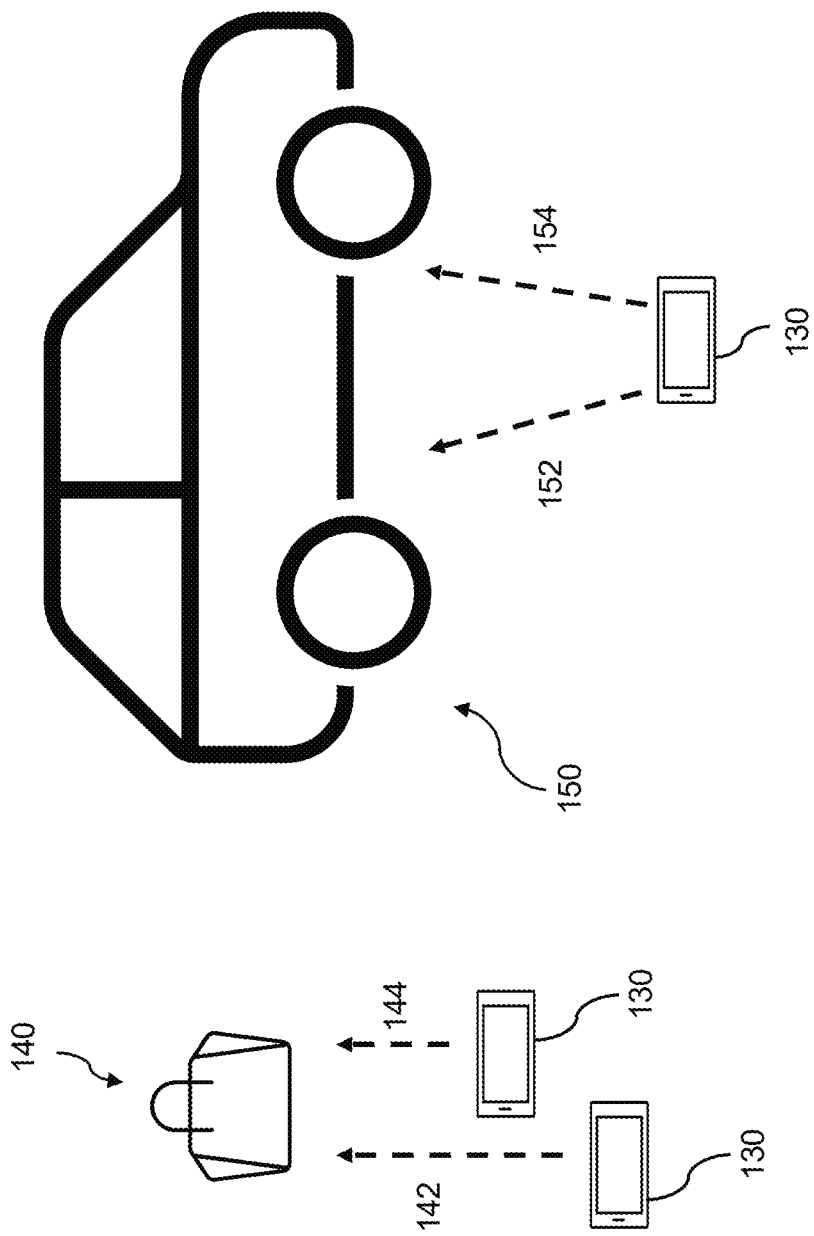
FIG. 1C is a diagram of a client device acquiring digital image data (e.g., by a user) of an object to be evaluated, according to one embodiment of the present disclosure.

FIG. 1C depicts example embodiments in which a user obtains visual information of an object to be evaluated. It is noted that the procedure depicted in FIGS. 1A and 1B (e.g., one for data archival that uses higher-quality images, such as images obtained using added lighting in a "studio" set up) need not be employed by the user wishing to evaluate an object's provenance and/or surface status. As depicted in FIG. 1C, a client device 130 (e.g., a smartphone or other image capture device, which can be the same as, or different from, client device 120) can be used to image an object. In FIG. 1C, a handbag 140 is depicted on the left, and a vehicle 150 is depicted on the right. In various embodiments, the user may obtain one image or multiple images. If multiple images are acquired, in different examples, one or more first images 142 may be from a first distance, and one or more second images 144 may be from a second distance from the object. Similarly, if multiple images are acquired, one or more first images 152 may be from a first perspective/angle 152, and one or more second images 154 may be from a second perspective/angle 154. It is noted that, alternatively or additionally, video imagery may be obtained as a user moves the client device 130 to different positions relative to the object to be evaluated. In some embodiments, multiple different client devices may be used (e.g., a first client device that is a smartphone camera and a more specialized second client device that detects light differently, such as one that is better at capturing light of certain wavelengths).

In various embodiments, is thus possible to capture or otherwise use any combination of one or more of: a single image from a first angle; a single image from a second angle; a single image from a first distance; a single image from a second distance; multiple images comprising any combination of a plurality of a first image from the first angle and the first distance, a second image from the first angle and the second distance, a third image from the second angle and the first distance, and a fourth image from the second angle and the second distance; and/or one or more segments ("clips") with video imagery as the client device is stationary with respect to, or moved relative to, the object (e.g., moved between the first distance, the second distance, the first angle, and/or the second angle). It is noted that because video imagery may be processed by the client device 130 before being saved and output, and because such processing may remove or obfuscate certain visual information, it may be preferable to have "raw" or unprocessed images and video (rather than images or video processed, e.g., to account for camera jitter, enhance lighting, or reduce blurring). Once the image(s) and/or video are captured, they may be, for example, uploaded or otherwise transmitted to an object authenticity system for evaluation of provenance and/or surface status.

Figure 2:
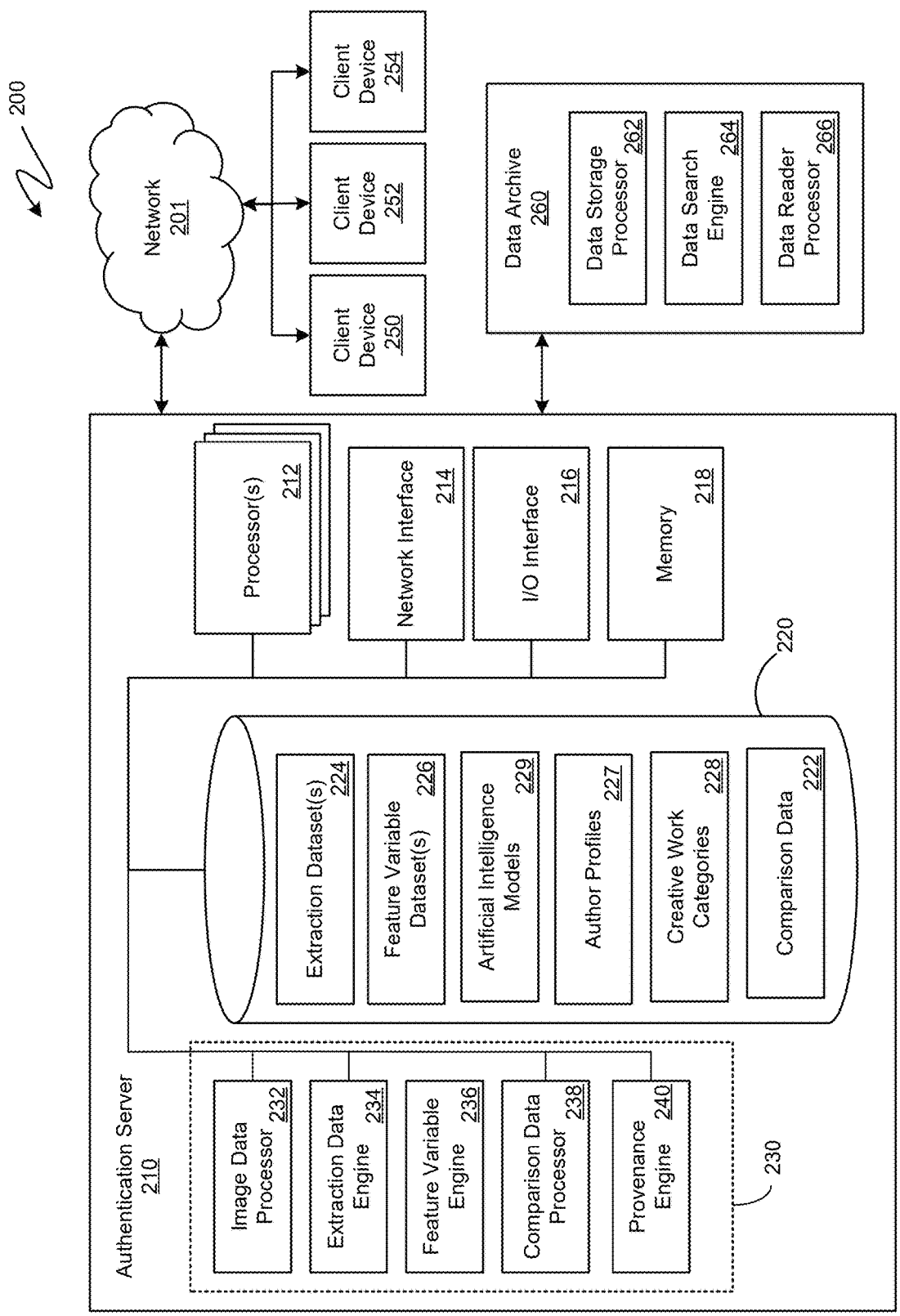
FIG. 2 is a block diagram of an object provenance system, according to one embodiment of the present disclosure.

FIG. 2 is a block diagram of an object provenance system 200, according to one embodiment of the present disclosure. The system 200 can include the authentication server 210 in communication with one or more client devices 250, 252, 254 via a communication network 201.

The client devices 250, 252, and 254 may be any suitable digital imaging device (or combination of imaging device and one or more processors and/or computing devices) that is capable of collecting image data of an object and communicating, via the network 201, the collected digital image data to the authentication server 201, as described above with reference to the client device 120 shown in, and described with reference to, FIGS. 1A and 1B. For example, the client devices 250, 252, and 254 may include, in some embodiments, a full frame digital camera coupled to one or more processors capable of communications (e.g., transmitting digital image data of an object, including metadata associated with one or more collected digital images) via the network 201. In that example, the digital camera of the one or more client devices 250, 252, and 254 may be a full frame digital camera capable of outputting digital images in a raw image file format and with a digital resolution of at least 30 Megapixels. The one or more processors coupled to the digital camera may include a laptop or mobile (e.g. smartphone or tablet) computing device that is capable of receiving the digital image data collected by the digital camera and communicating it, via the network 201 (e.g., the internet), to one or more authentication servers (e.g., authentication server 210). As described previously, with reference to FIGS. 1A and 1B, a variety of different configurations are contemplated for each, or both, of the client device(s) and/or the authentication server 210, or any of the components or data included in either, or both, of those.

The authentication server 210 can include one or more processors 212, a network interface 214, an input/output ("I/O") interface 216, and a memory 218. The one or more processors 212 may include one or more general purpose devices, such as an Intel®, AMD®, or other standard microprocessor. Alternatively, or in addition, in some embodiments, the one or more processors 212 may include a special purpose processing device, such as ASIC, SoC, SiP, FPGA, PAL, PLA, FPLA, PLD, or other customized or programmable device. The one or more processors 212 can perform distributed (e.g., parallel) processing to execute or otherwise implement functionalities of the presently disclosed embodiments. The one or more processors 212 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The network interface 214 may facilitate communication with other computing devices and/or networks such as the communications network 201 and the client devices 250, 252, and 254 and/or other devices (e.g., one or more additional authentication server(s)) and/or communications networks. The network interface 214 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network interface 214 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The I/O interface 216 may facilitate interfacing with one or more input devices and/or one or more output devices. The input device(s) may include a keyboard, mouse, touch screen, scanner, digital camera, digital imaging sensor(s), light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The memory 218 may include static RAM, dynamic RAM, flash memory, one or more flip-flops, ROM, CD-ROM, DVD, disk, tape, or magnetic, optical, or other computer storage medium. The memory 218 may include a plurality of engines (e.g., program modules or program blocks) 230 and program data 220. The memory 218 may be local to the authentication server 210, as shown, or may be distributed and/or remote relative to the communication authentication and verification server 210.

The memory 218 may also include program data 220. Data generated by the system 210, such as by the engines 230 or other components of server 210, may be stored on the memory 218, for example, as stored program data 220. The stored program data 220 may be organized as one or more databases. In certain embodiments, the program data 220 may be stored in a database system. The database system may reside within the memory 218. In other embodiments, the program data 220 may be remote, such as in a distributed (e.g., cloud computing, as a remote third-party service(s), etc.) computing and/or storage environment. For example, the program data 220 may be stored in a database system on a remote computing device. In still other embodiments, portions of program data 220*m*, including, for example, one or more output(s) generated by the engines 230, may be stored in a content addressable storage system, such as a blockchain data storage system.

The authentication server 210 further includes server data 220, comprising a comparison data 222, one or more extraction datasets 224, one or more feature variable datasets 226, origin profiles 227, object categories 228, and one or more artificial intelligence models 229.

The comparison data 222 may include one or more datasets based on (e.g., generated from), the digital image data of a plurality of additional objects. The comparison data 222 may include, for example, the digital image data collected for each of the additional objects in the plurality of additional objects (e.g., each digital image dataset of an additional object that has been received by the authentication server 210). In some embodiments, the comparison data 222 may include one or more imagery datasets of each additional object and each additional object is a similar type of object as the object to be authenticated. For example, for authentication of an object that is a gemstone, the comparison data 222 may include one or more imagery datasets of gemstones, including, for example, one or more gemstones of the same gemstone type as the object or gemstone being authenticated (e.g., for authentication of a ruby, the comparison data 222 may include one or more imagery datasets of one or more rubies).

Additionally, the comparison data 222 may include one or more of the feature variable datasets 226, including a set of one or more feature variables for each of the additional objects of the plurality of additional objects (e.g., one or more feature variable(s) previously determined, by the authentication server 210 and/or feature variable engine 236, for an additional object and based on the corresponding digital image dataset received by the server 210 or image data processor 232). For example, the comparison data 222 may include a feature variable dataset 226 for each additional object that includes the one or more feature variables determined (e.g., by the feature variable engine 236) for that same object. In some embodiments, the comparison dataset may include a subset of the feature variables determined for an additional object and included in the corresponding feature variable dataset 226.

Each set of feature variables included in the comparison data can be comprised of any combination of one or more of the different types of feature variables included in the feature variable datasets 226 and described in greater detail below, with reference to the feature variable datasets 226.

The one or more extraction datasets 224 can include one or more datasets extracted or otherwise generated from the received image data (e.g., the image data received for the object to be authenticated). Alternatively, or in addition, in some embodiments, the extraction datasets 224 can include extraction data generated from one or more imagery datasets, or generated by the extraction engine 234 based on the image data of the object. In some embodiments, the extraction engine may generate one or more different types of extraction datasets, including, for example, one or more object color (e.g., an object inclusions, body color, detail color, highlight color, black distribution, chromatic spectrum, chromatic hatching, and chromatic volumes) extraction datasets, one or more object volumetric (e.g., object shape, object patterns, object depth, object image, object profile, and/or object details) extraction datasets (e.g., the volumetric extraction dataset 510 and the detail extraction dataset 512, shown in FIG. 5), and one or more image (e.g., collectable stamp image(s), coin image(s), signature detail(s), calligraphic brush pattern(s), backside pattern, print pattern, stamp pattern, etc.) extraction datasets.

Alternatively, or in addition, the extraction engine 234 may generate one or more extraction datasets that can include separately or in combination, for example, reflectivity data, opacity data, material data, print data (e.g., for stamps, trading cards, and/or coins), palette data, mid-tones data, pattern data, campiture data, pigment density data, signature material data, signature color data, signature evaluation data, and evaluation of pressure points data.

The one or more feature variable datasets 226 can include each set of feature variables determined for an object during operation of the system 200 (e.g., during the operation of the server 210 to determine an origin of, generate an origin score for, generate an authenticity score of, or otherwise ascertain authenticity of, that object). The feature variable datasets 226 can include a plurality of feature variable datasets with one or more feature variables determined for a particular (e.g., a single specific) object. The feature variables stored in the various sets of the feature variable datasets 226 can include, for example, one or more of the following, non-exhaustive and non-limiting, list of different feature variables: a reflectivity percentage, a color percentage, a uniformity percentage, an inclusions percentage, an inclusions frequency map, pantone series, a posterized pantone series, a brights percentage, a mid-tones percentage, one or more discrepancies with a previous image data for the same object (or the output(s) generated based on the previous image data), a brush sign frequency map on a subject of the object, a brush sign frequency map on a background of the object, a positive campiture percentage, a composition probability map of an object, a pigment density map, a pigment permeation map, a signature pantone code, a signature tag word, a calligraphic sign vector, and a calligraphic pressure map. Additionally, in other embodiments, the feature variable datasets 226 may include one or more additional feature variables that are not expressly included in the above list of feature variables but that, nevertheless, are inherently disclosed in the variety of different feature variables that are expressly disclosed in the list above. For example, in some embodiments, the one or more feature variable datasets may include a modified version of one or more feature variables, including a combination of one or more of the feature variables listed above.

Each set in the feature variable datasets 226 can include its one or more feature variables (e.g., the feature variable data, or the feature variables themselves) and associated metadata that identifies at least one object (or its digital image data) associated with that set of feature variables. For example, metadata associated with, or contained in, a feature variable dataset can identify one or more, or all, of: objects used to determine the feature variables corresponding to that set of feature variables; one or more comparison data (or comparison datasets) with, in some examples, one or more corresponding sets of feature variables, and the like.

The origin profiles 227 can include a plurality of different origin profiles (or origin profile data) and each origin profile corresponds to a single origin of one or more objects (e.g., an origin of one or more of the plurality of additional objects associated with a comparison dataset). Each of the origin profiles 227 can include one or more different pieces of information regarding its corresponding origin. For example, an origin profile can include at least one name associated with the profile's origin (e.g., one or more given or legal names, one or more stage or pen names, or one or more pseudonyms of the origin). An origin profile can also include one or more periods of time associated with the origin or one or more of the origin's objects (e.g., an period of time defined by the origin's lifetime of operation, one or more periods of time defined by the publication date(s) for one or more of the origin's objects, a period of time associated with one or more of the origin's objects that are associated with one or more object categories (e.g., one or more object types (gemstone, stamp, coin, jewelry, etc.) one or more origin or source types, printing techniques, fabrication styles, artistic movements or artistic styles). Additionally, an origin profile may include one or more geographic location(s) associated with the origin, including, for example, a geographic source, a geological region, one or more physical conditions, printing techniques, author birthplace, one or more primary residences of an author and associated with one or more of the author's objects, a geographical region of one or more related objects and/or sources associated with the origin, etc.). In some embodiments, an origin profile may contain one or more known, or previously authenticated, objects associated with the origin or any of the origin's objects. For example, the origin profile may identify a plurality of objects that substantially influenced the characteristics of, or the style used in, one or more of the origin's objects (e.g., one or more objects of another origin that was related and/or relevant to the origin). In some embodiments, an origin profile may include one or more characteristics associated with the origin's object(s) and associated with one or more objects of one or more different origin(s). In some embodiments, the origin profile may include one or more types of information not expressly included in the examples of origin profile information that are described above. For example, in some embodiments, an origin profile may include one or more additional types of information regarding the profile's origin, including, for example, a modified version of one or more examples of origin profile information described above and may include one or more combinations of two or more of the examples of origin profile information described above.

The object categories 228 can include one or more different categories of object(s), which may comprise an association between the one or more objects (or one or more of their characteristics) included in that category of objects. For example, the object categories may include one or more categories of objects according to an artistic style or creative movement that is associated with each of the objects (or their characteristics) included in that category. For example, the object categories 228 can include one or more categories of object(s), which include an association of each object (or its characteristics) included in the category of objects. For example, the object categories 228 can include categories for objects associated with one or more of the following non-limiting and non-exhaustive list of example categories: a gemstone category, a physical composition category, an inclusion percentage category, a precious metal category, a collectables category, a tenebrosi category, a baroque category, an impressionist category, a surrealist category, a cubism category, a pop art category, a photorealistic category, and the like. Some embodiments may include one or more additional categories of objects beyond the non-limiting list of example categories above. For example, the categories of object(s) may include a category for an association between a plurality of objects (or their characteristics) based on one or more general criteria, principals, patterns, and the like, that may be substantially present in, or define an association between, each of the objects included in (or associated with) that category.

The one or more artificial intelligence models 229 can determine an object authenticity score, object origin, object origin score, or object origin authenticity score, of the first object based on at least one or more feature variables of the first object and a comparison dataset.

The one or more artificial intelligence models 229 can include one or more machine learning models trained to generate an output based on one or more matching portions of the results for a digital image dataset of an object (e.g., one or more feature variables, one or more origin profiles, one or more object categories, or digital image data, etc.) and of a comparison dataset (e.g., one or more corresponding feature variables, origin profile(s), object categories, or digital image data) used to determine an authenticity score, an origin, an origin score, an authenticity result of, or otherwise ascertain an authenticity or origin for, the object captured or otherwise included in the corresponding image data (e.g., the object imaged by one or more of the client devices 250, 252, 254 or otherwise captured in received image data, including first image data, second image data, third image data, fourth image data, etc.). For example, the models 229 can include an artificial intelligence model trained to identify any feature variables that are present in the comparison dataset. In an aspect, the feature variables can be used to determine the provenance of the object. For example, a provenance engine 240 can execute one or more artificial intelligence models to identify and associate objects, or their associated feature variables, origin profiles, etc. The provenance engine 240 may perform one or more of its functions via updates to the comparison dataset used to determine a provenance (e.g., generate a provenance score for) the object in the image data received by the server 210. In an aspect, the feature variable can be utilized by the provenance engine 240 to determine an authenticity of the object. For example, an authenticity engine of the provenance engine 240 can execute one or more artificial intelligence models to identify and associate objects, or their associated feature variables, origin profiles, etc. The authenticity engine may perform one or more of its functions via updates to the comparison dataset used to determine an authenticity (e.g., generate an authenticity score for) the object in the image data received by the server 210. In an aspect, the feature variables can be used by the provenance engine 240 to determine an origin of the object. For example, an origin engine can execute one or more artificial intelligence models to identify and associate objects, or their associated feature variables, origin profiles, etc. The origin engine may perform one or more of its functions via updates to the comparison dataset used to determine an origin of (e.g., generate an origin score for) the object in the image data received by the server 210. In some implementations, the authentication server 210 (or comparison data processor 238) can execute one or more of the artificial intelligence models 229 of program data 220 in response to determining one or more feature variables for a digital image data output by the image data processor 232.

In some examples, the artificial intelligence models 229 of the authentication server 210 can be, or may include, one or more neural networks. Each of the artificial intelligence models 229 can be a single shot multi-box detector, and can process an entire dataset of the received image data (e.g., digital image data, one or more feature variables, origin profile(s), and the object categories of the object to be authenticated) in one forward pass. Processing the entire dataset of the object (e.g., the object to be authenticated) in one forward pass can improve processing efficiency, and enables the artificial intelligence models of the authentication server 210 to be utilized for object authentication tasks in near real time or with minimal delay (e.g., minimal delay between the time when image data of the object is collected and the authenticity result of the object is provided).

In some examples, one or more of the artificial intelligence models 229 can incorporate aspects of a deep convolutional neural network (CNN) model, which may include one or more layers that may implement machine-learning functionality for one or more portions of the operations performed by the engines 230. The one or more layers of the models 229 can include, in a non-limiting example, convolutional layers, max-pooling layers, activation layers and fully connected layers, among others. Convolutional layers can extract features from the input image dataset(s) (or input comparison data) of the object using convolution operations. In some examples, the convolutional layers can be followed, for example, by activation functions (e.g., a rectified linear activation unit (ReLU) activation function, exponential linear unit (ELU) activation function, etc.), model. The convolutional layers can be trained to process a hierarchical representation of the input data (e.g., input image data and/or feature variables based on the same), where lower level features are combined to form higher-level features that may be utilized by subsequent layers in the artificial intelligence model(s) 229 or the execution of a corresponding machine learning model (e.g., execution of one or more of the artificial intelligence models 229 by one or more of a feature variable processor 236, a comparison data processor 238, and/or a provenance engine 240).

The artificial intelligence model(s) may include one or more max-pooling layers, which may down-sample the feature maps produced by the convolutional layers, for example. The max-pooling operation can replace the maximum value of a set of pixels in a feature map with a single value. Max-pooling layers can reduce the dimensionality of data represented in the image data processor 232, the extraction data engine 234, the feature variable engine 236, the comparison data processor 238, the provenance engine 240 and any (or all) of the one or more artificial intelligence models 229. The one or more of the models 229 may include multiple sets of convolutional layers followed by a max-pooling layer, with the max-pooling layer providing its output to the next set of convolutional layers in the artificial intelligence model. The model(s) 229 can include one or more fully connected layers, which may receive the output of one or more max-pooling layers, for example, and generate predictions (e.g., an authenticity score, associated origin profile(s), associated object categories, etc.) as described herein. A fully connected layer may include multiple neurons, which perform a dot product between the input to the layer and a set of trainable weights, followed by an activation function. Each neuron in a fully connected layer can be connected to all neurons or all input data of the previous layer. The activation function can be, for example, a sigmoid activation function that produces class probabilities for each object class for which the artificial intelligence model is trained. The fully connected layers may also predict the bounding box coordinates for each object detected in the input dataset(s) (e.g., in one or more feature variables of the object to authenticate or one or more corresponding portions of the comparison dataset).

The authentication server 210 may include several engines 230 (e.g., program modules) including, an image data processor 232, an extraction data engine 234, a feature variable engine 236, a comparison data processor 238, and a provenance engine 240.

The engines 230 may include all or portions of the other elements of the authentication server 210 (e.g., program data 220, the processors 212, etc.). The engines 230 may run multiple operations concurrently or in parallel by or on the one or more processors 212. In some embodiments, portions of the disclosed engines, processors, components, blocks, and/or facilities are embodied as executable instructions embodied in hardware or in firmware, or stored on a non-transitory, machine-readable storage medium, such as the memory 218. The instructions may comprise computer program code that, when executed by a processor and/or computing device, cause a computing system (such as the processors 212 and/or the authentication server 210) to implement certain processing steps, procedures, and/or operations, as disclosed herein (e.g., one or more steps of methods 300 and 400, which are described below with reference to FIGS. 3 and 4, respectively). The modules, components, and/or facilities disclosed herein may be implemented and/or embodied as a driver, a library, an interface, an API, FPGA configuration data, firmware (e.g., stored on an EEPROM), and/or the like. In some embodiments, portions of the engines, processors, components, blocks, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the engines and processors disclosed herein may be referred to as controllers, layers, services, modules, blocks, facilities, drivers, circuits, and/or the like.

The image data processor 232 can receive and process the digital image data collected by a client device 250, 252, 254 and received by the authentication server 210 via the network 201. The image data processor 232 may identify an object associated with each set of digital image data that the server 210 receives or stores (e.g., in program data 220 and/or memory 218) to determine the authenticity of (e.g., authenticity score(s) or other authenticity result(s) of) one or more object(s). Accordingly, in some embodiments, the image data processor 232 may identify one or more sets of image data associated with the same object (e.g., separate sets of image data received to generate multiple authenticity scores for the same object).

In some embodiments, the image data processor 232 may verify whether a received digital image dataset adheres to one or more mandatory criteria (e.g., minimum specifications) for the acquisition of acceptable image data of an object. For example, the image data processor 232 may verify whether a received digital image dataset comprises digital image data in one or more file formats (e.g., a raw digital image file or the like), whether the digital image data (or the imaging device used to collect it) satisfies one or more minimum technical specifications (e.g., a minimum image resolution, a minimum digital image sensor size, etc.), and/or whether the digital image data has been collected according to specified imaging criteria (e.g., whether images are properly framed, whether image data was collected at proper distance(s), etc.). For example, the image data processor 232 may verify whether an image dataset was collected at a specified first distance by calculating an expected pixels per inch of the image dataset and determining an actual pixels per inch of the image dataset and comparing the expected pixels per inch with the actual pixels per inch.

For example, in some embodiments, the image data processor 232 may determine an expected pixels per inch (e.g., at a first distance) for one or more digital images of the image dataset based on a digital image output resolution for the digital imaging device used to collect the image dataset and an expected (e.g., required) first distance. Additionally, in some embodiments, the image data processor 232 may determine an actual pixels per inch (e.g., at the first distance) for the one or more digital images of the image dataset based on the actual digital resolution of the one or more digital images and one or more physical dimensions of the object depicted in the image dataset. Accordingly, in some embodiments, the image data processor 232 may determine an actual pixels per inch of one or more digital images based on the actual resolution of the one or more images and based on the height or length of the object (e.g., a side length of a flat (substantially two-dimensional) painting (canvas) or a known length of a three-dimensional object or sculpture).

The extraction engine 234 can extract or otherwise generate one or more separate imagery datasets from the image data received for an object (e.g., output by the image data processor 232). The extraction engine 234 may generate each of the one or more separate imagery datasets to include a specified type, or types, of digital images of the object. For example, the extraction engine 234 can generate a color imagery dataset comprising that portion of the image data pertinent to an analysis of one or more colors present in the object (e.g., embodiments of a color imagery dataset may exclude digital images that depict only the backside/rear canvas of an object). As another example, the extraction engine 232 can generate a volumetric image dataset comprised of that portion of the image data that is associated with, or depicting a portion of, the volumetric features of the object. Similarly, in yet another example, the extraction engine 232 may generate a calligraphic imagery dataset using that portion of the digital image data that captures at least a portion of the calligraphy data that may be present in the image data of the object to be authenticated. In some embodiments, the extraction engine 234 may generate each of the one or more separate imagery datasets to include only a specified type, or types, of digital images of the object.

Figure 5:
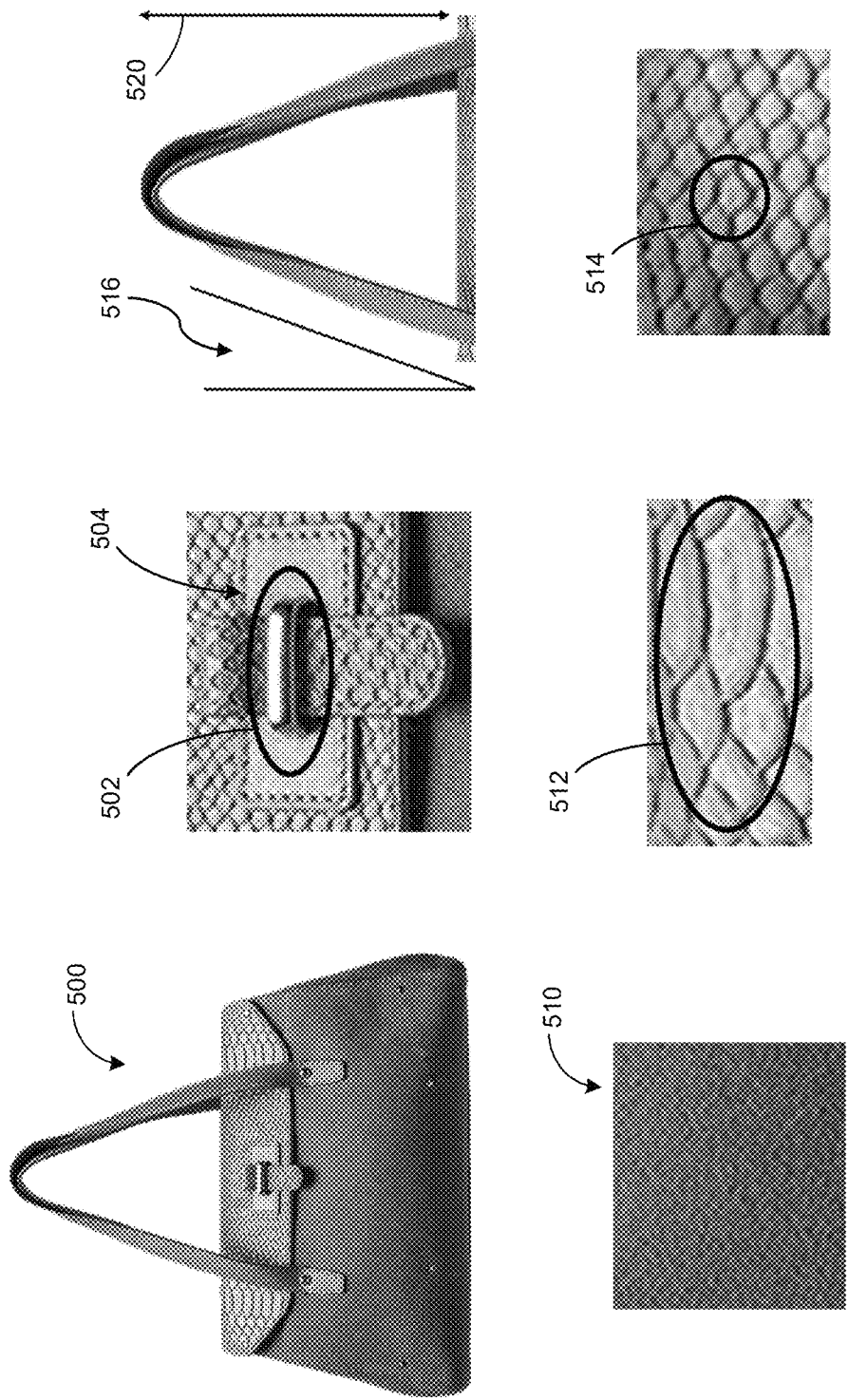
FIG. 5 depicts example object features captured in image data of the object, according to one embodiment of the present disclosure.

The extraction engine 234 can generate one or more extraction datasets from the image data of an object (e.g., the image data received by or output from the image data processor 232) or, alternatively, from one or more imagery datasets generated, by the extraction engine 234, based on the image data of the object. In some embodiments, the extraction engine may generate one or more different types of extraction datasets, including, for example, one or more color (e.g., a highlights, mid-tones, and blacks distribution, a chromatic spectrum, a chromatic hatching, and a chromatic volumes) extraction datasets, one or more volumetric (e.g., craquelure patterns, craquelure details, brush patterns, canvas details, canvas weave pattern, backside/support detail)

extraction datasets (e.g., the volumetric extraction dataset 510 and the brushstroke extraction dataset 512, shown in FIG. 5), and one or more calligraphic (e.g., signature detail(s), calligraphic brush pattern(s), backside pattern) extraction datasets.

Alternatively, or in addition, the extraction engine 234 may generate one or more extraction datasets that include, for example, one or more extraction datasets for one or more of: palette data, mid-tones data, pattern data, campiture data, pigment density data, signature material data, signature color data, signature evaluation data, and evaluation of pressure points data.

For example, the extraction engine 234 may generate one or more color extraction datasets based on one or more digital images of a color image dataset, which the extraction engine 234 generated from a subset of the digital images included in the image data received for an object (e.g., digital image data, one or more digital image data packs, output from the image data processor 232 or received, via network 201, from one of the client devices 250, 252, 254). As another example, the extraction engine 234 may extract a calligraphic, or signature, extraction dataset (e.g., calligraphic extraction dataset 710 shown in FIG. 7) from a calligraphic imagery dataset that only includes at least one digital image of the backside of the object (e.g., backside image data 602, backside support image data 604, and canvas extraction dataset 610, each shown in FIG. 6), and at least one digital image of any calligraphy (e.g., any origin signature(s) or any other stylized writing) that is present in the object.

The feature variable engine 236 can determine one or more feature variables of an object based on one or more of the received image data (of the object), a plurality of imagery datasets generated by the extraction engine 234 based on the received image data, or one or more extraction datasets generated by the extraction engine 234 (e.g., as described in greater detail above). The one or more feature variables determined by the feature variable engine 236 may include, for example, one or more of: a pantone series, a posterized pantone series, a brights percentage, a mid-tones percentage, discrepancies with previous image data (or output(s) based on the previous image data) of the same object, a brush sign frequency map on a subject of the object, a brush sign frequency map on a background of the object, a positive campiture percentage, a probability map for a composition of the object, a pigment density and permeation map, a signature pantone code, a signature tag word, a calligraphic sign vector, and a calligraphic pressure map.

The comparison data processor 238 can process one or more portions of the comparison data 222, including to identify one or more comparison datasets to use in generating an origin, an origin score, an authenticity estimation, an authenticity score, or any other authenticity result, for an object. For example, the comparison data processor 238 may identify a comparison dataset based on one or more similarities between the comparison dataset and the object for which an origin may be determined or for which an origin score or authenticity score will be generated. More specifically, the comparison data processor 238 may identify a comparison dataset from a plurality of additional objects that were created within the same geographic region, or during substantially the same time period, as the object to be authenticated.

Alternatively, or in addition, the comparison data processor 238 may identify a comparison dataset based on one or more object categories associated with, or one or more additional objects that include, one or more feature variables that are substantially similar to (e.g., nearly identical or having only difference(s) below a specified threshold) the one or more feature variables determined for the object being authenticated. Alternatively, in some embodiments, the comparison data processor 238 may identify a comparison dataset from a plurality of objects that includes only a minor subset (e.g., a small minority) of objects that are substantially similar to the object being authenticated. The comparison data processor 238 may determine a number of additional objects to include in a comparison dataset based, in part, on the number of substantially similar objects that it will include and the extent of any similarities (e.g., a match percentage) between the plurality of additional objects of a comparison dataset and with the object to be authenticated.

Additionally, the comparison data processor 238 may modify (e.g., update) one or more portions of the comparison data 222 according to a modified comparison dataset. The modified comparison dataset may be determined from, or indicated by, one or more of the output(s) generated by one or more components of the server 210 (e.g., the extraction data engine 234, the feature variable engine 236, and the provenance engine 240). For example, the provenance engine 240 and the feature variable engine 236 may output, via one or more machine learning models used to generate a provenance score, a modified metadata for the comparison dataset used to generate a new provenance score, which identifies a modified set of associated objects and/or aspects of the same (e.g., origin profile(s), object categories, etc.). As another example, the provenance engine 240 and the feature variable engine 236 may output, via one or more machine learning models used to generate an authenticity score, a modified metadata for the comparison dataset used to generate a new authenticity score, which identifies a modified set of associated objects and/or aspects of the same (e.g., origin profile(s), object categories, etc.). As another example, the provenance engine 240 and the feature variable engine 236 may output, via one or more machine learning models used to generate an origin score, a modified metadata for the comparison dataset used to generate a new origin score, which identifies a modified set of associated objects and/or aspects of the same (e.g., origin profile(s), object categories, etc.).

The comparison data processor 238 can modify a portion of the comparison data 222 based on the output(s) generated by the one or more artificial intelligence models 229 (e.g., a modified comparison dataset indicated by the output(s) generated by one or more machine learning models implemented by the provenance engine 240. For example, the comparison data processor 238 may modify a portion of the comparison data 222 (e.g., a first comparison dataset) according to a determination to add a new object to a set of objects associated with one or more of the following: one or more characteristics of an object, one or more origin profile(s) (e.g., one or more origin profiles for origin(s) that taught, criticized, or otherwise influenced, the origin(s) of an associated object), one or more object categories (e.g., a "footwear" category, an "accessory" category, a "handbag" category, etc.), one or more geographic region(s) (e.g., a geographic region where an object was created or otherwise associated with an object), and one or more time period(s) (e.g., time period defined by one or more origin(s), a time period defined by the creation of one or more objects, etc.). For example, the comparison data processor 238 can determine one or more portions of the comparison data 222 associated with one or more characteristics to include in a comparison dataset used to generate an origin, origin score, and/or authenticity score of an object, (e.g., object 110).

The provenance engine 240 may generate a provenance score (or other provenance indication) for the object of the image data received by the authentication server (e.g., from one of the client devices 250, 252, 254) for the object. The provenance engine 240 may include one or more artificial intelligence models 229 that are trained to generate one or more output(s) based on one or more input(s). The one or more outputs may be generated based, for example, at least in part on a comparison of the determined set of feature variables and the comparison dataset identified by the comparison data processor 238. The provenance engine 240 may execute the one or more artificial intelligence models 229 to generate an output indicative of a provenance score for the object (i.e., the object of the determined set of feature variables) and one or more outputs indicative of change(s) to the comparison dataset, which reflect the new comparison data generated from the authentication of the first object. The provenance engine 240 may execute a first artificial intelligence model trained to generate an output indicative of a provenance score for the first object (e.g., the object to be authenticated), based on inputs that include at least the determined set of feature variables (of the object to be authenticated) and the comparison dataset output by the comparison data processor 238. For example, the first artificial intelligence model may be trained to generate the output indicative of the provenance score based on a determined match percentage for the determined set of feature variables and one or more corresponding sets of feature variables (e.g., one or more sets of feature variables that exhibit a matching percentage (e.g., a percentage of matching feature variables) that is directly correlated with (e.g., proportional to) the probable provenance of, and thus the provenance score generated for, the object being authenticated by system 200.

In some embodiments, the provenance engine 240 can partition, into two or more subsets, each of the following that correspond to an object to be authenticated: one or more feature variables, a plurality of different image data packs, one or more datasets extracted from an image data pack, and the received digital image data for that object. For example, the provenance engine 240 can partition, for an object to be authenticated, each of the information listed above into two or more subsets associated with different potential sources. The provenance engine 240 may, for example, use the two or more subsets associated with different sources for a comparison of the information for an object against itself, which may be part of the process to generate the provenance score of that object. In some embodiments, the provenance engine 240 (or authentication server 210) can partition the information above into at least one subset associated with a source and one or more subsets not associated with any source, or for which no source can be determined.

In some embodiments, the provenance engine 240 (or the processors of the authentication server 210) can determine a consistency metric of the two or more subsets based on a comparison of one or more portions of two or more corresponding datasets in each of the different subsets. The consistency metric may be determined with a comparison of two or more entire subsets (e.g., using corresponding values or metrics that are representative of, or based on, the contents of the corresponding subset). Alternatively, or in addition, the consistency metric of two or more subsets may be determined by a piecewise comparison using the corresponding individual types of data contained in the two or more subsets (e.g., comparing, between the two or more subsets, each of the following: feature variables, digital image data packs, datasets extracted from digital image data packs, etc.). In some embodiments, the consistency metric of two or more subsets may be based on a variance (e.g., variance data or vector) between the two or more subsets (or, for a piecewise comparison, their individual contents).

In some embodiments, the provenance engine 240 (or the processors of the authentication server 210) can determine an internal consistency metric for a single subset (e.g., of the two or more subsets partitioned by the provenance server 240, as described above) based on a comparison of one or more portions of data in the different datasets (e.g., feature variables, digital image data, digital image data packs, etc.) within that same subset. For example, the provenance engine 240 may determine an internal consistency metric based on a variance of one or more types of datasets contained in that subset (e.g., a variance of the feature variables, a variance of the digital image packs, etc.). Alternatively, or in addition, the internal consistency metric for a single subset may be determined based on a comparison with an expected variance between two different types of datasets of the subset and an actual, or determined, variance between those same two types of datasets of the subset (e.g., a comparison of an expected variance between a feature variable and a digital image data pack with an actual variance that is determined for that feature variable and digital image data pack within the same subset).

In some embodiments, the provenance engine 240 can determine, based on a comparison of the consistency metric of the two or more subsets and the internal consistency metric of a single subset, a confidence score for one or more of the datasets (e.g., one or more feature variables, image data packs, etc.) associated with the first object (or its digital image data). For example, in some embodiments, the provenance engine 240 can determine a confidence score based on whether either (or both) of the consistency metric of the two or more subsets and the internal consistency metric are less than a threshold. Alternatively, or in addition, the provenance engine 240 may determine a confidence score based on a determination that the difference of two consistency metrics does, or does not, exceed a threshold. In some embodiments, the provenance engine 240 can determine a confidence score based on the difference between an expected mathematical relation of the consistency metrics and a corresponding actual, or computed, mathematical relation of the consistency metrics.

In an aspect, the provenance engine 240 may comprise or include an authenticity engine that may generate an authenticity score (or other authenticity indication) for the object of the image data received by the authentication server (e.g., from one of the client devices 250, 252, 254) for the object. The authenticity engine may include one or more artificial intelligence models 229 that are trained to generate one or more output(s) based on one or more input(s). The one or more outputs may be generated based, for example, at least in part on a comparison of the determined set of feature variables and the comparison dataset identified by the comparison data processor 238. The authenticity engine may execute the one or more artificial intelligence models 229 to generate an output indicative of an authenticity score for the object (i.e., the object of the determined set of feature variables) and one or more outputs indicative of change(s) to the comparison dataset, which reflect the new comparison data generated from the authentication of the first object. The authenticity engine may execute a first artificial intelligence model trained to generate an output indicative of an authenticity score for the first object (e.g., the object to be authenticated), based on inputs that include at least the determined set of feature variables (of the object to be authenticated) and the comparison dataset output by the comparison data processor 238. For example, the first artificial intelligence model may be trained to generate the output indicative of the authenticity score based on a determined match percentage for the determined set of feature variables and one or more corresponding sets of feature variables (e.g., one or more sets of feature variables that exhibit a matching percentage (e.g., a percentage of matching feature variables) that is directly correlated with (e.g., proportional to) the probable authenticity of, and thus the authenticity score generated for, the object being authenticated by the system 200.

In some embodiments, the authenticity engine can partition, into two or more subsets, each of the following that correspond to an object to be authenticated: one or more feature variables, a plurality of different image data packs, one or more datasets extracted from an image data pack, and the received digital image data for that object. For example, the authenticity engine can partition, for an object to be authenticated, each of the information listed above into two or more subsets associated with different potential sources. The authenticity engine may, for example, use the two or more subsets associated with different sources for a comparison of the information for an object against itself, which may be part of the process to generate the authenticity score of that object. In some embodiments, the authenticity engine can partition the information above into at least one subset associated with a source and one or more subsets not associated with any source, or for which no source can be determined.

In some embodiments, the authenticity engine can determine a consistency metric of the two or more subsets based on a comparison of one or more portions of two or more corresponding datasets in each of the different subsets. The consistency metric may be determined with a comparison of two or more entire subsets (e.g., using corresponding values or metrics that are representative of, or based on, the contents of the corresponding subset). Alternatively, or in addition, the consistency metric of two or more subsets may be determined by a piecewise comparison using the corresponding individual types of data contained in the two or more subsets (e.g., comparing, between the two or more subsets, each of the following: feature variables, digital image data packs, datasets extracted from digital image data packs, etc.). In some embodiments, the consistency metric of two or more subsets may be based on a variance (e.g., variance data or vector) between the two or more subsets (or, for a piecewise comparison, their individual contents).

In some embodiments, the authenticity engine can determine an internal consistency metric for a single subset (e.g., of the two or more subsets partitioned as described above) based on a comparison of one or more portions of data in the different datasets (e.g., feature variables, digital image data, digital image data packs, etc.) within that same subset. For example, the authenticity engine may determine an internal consistency metric based on a variance of one or more types of datasets contained in that subset (e.g., a variance of the feature variables, a variance of the digital image packs, etc.). Alternatively, or in addition, the internal consistency metric for a single subset may be determined based on a comparison with an expected variance between two different types of datasets of the subset and an actual, or determined, variance between those same two types of datasets of the subset (e.g., a comparison of an expected variance between a feature variable and a digital image data pack with an actual variance that is determined for that feature variable and digital image data pack within the same subset).

In some embodiments, the authenticity engine can determine, based on a comparison of the consistency metric of the two or more subsets and the internal consistency metric of a single subset, a confidence score for one or more of the datasets (e.g., one or more feature variables, image data packs, etc.) associated with the first object (or its digital image data). For example, in some embodiments, the authenticity engine can determine a confidence score based on whether either (or both) of the consistency metric of the two or more subsets and the internal consistency metric are less than a threshold. Alternatively, or in addition, the authenticity engine may determine a confidence score based on a determination that the difference of two consistency metrics does, or does not, exceed a threshold. In some embodiments, the authenticity engine can determine a confidence score based on the difference between an expected mathematical relation of the consistency metrics and a corresponding actual, or computed, mathematical relation of the consistency metrics.

In an aspect, the provenance engine 240 may comprise or include an origin engine that may determine an origin for the object of the image data received by the authentication server for the object. The origin engine may include one or more artificial intelligence models 229 that are trained to generate one or more output(s) based on one or more input(s). The one or more outputs may be generated based, for example, at least in part on a comparison of the determined set of feature variables and the comparison dataset identified by the comparison data processor 238. The origin engine may execute the one or more artificial intelligence models 229 to generate an output indicative of an origin or source for the object and one or more outputs indicative of change(s) to the comparison dataset, which reflect the new comparison data generated according to determining the origin of the first object. The origin engine may execute a first artificial intelligence model trained to generate an output indicative of an origin for the first object (e.g., the object to be authenticated), based on inputs that include at least the determined set of feature variables (of the object to be authenticated) and the comparison dataset output by the comparison data processor 238. For example, the first artificial intelligence model may be trained to generate the output indicative of the origin based on a determined match percentage for the determined set of feature variables and one or more corresponding sets of feature variables that is directly correlated with the probable origin of the object.

The origin engine may execute the one or more artificial intelligence models 229 to generate an output indicative of an origin score for the object and one or more outputs indicative of change(s) to the comparison dataset, which reflect the new comparison data generated according to determining the origin score of the object. The origin engine may execute a first artificial intelligence model trained to generate an output indicative of an origin score for the first object, based on inputs that include at least the determined set of feature variables (of the object to be authenticated) and the comparison dataset output by the comparison data processor 238. For example, the first artificial intelligence model may be trained to generate the output indicative of the origin score based on a determined match percentage for the determined set of feature variables and one or more corresponding sets of feature variables (e.g., one or more sets of feature variables that exhibit a matching percentage (e.g., a percentage of matching feature variables) that is directly correlated with (e.g., proportional to) the probable origin of, and thus the origin score generated for, the object (for which the system 200 is determining origin).

In some embodiments, the origin engine can partition, into two or more subsets, each of the following that correspond to the object: one or more feature variables, a plurality of different image data packs, one or more datasets extracted from an image data pack, and the received digital image data for that object. For example, the origin engine can partition, for an object, each of the information listed above into two or more subsets associated with different origins. The origin engine may, for example, use the two or more subsets associated with different origins for a comparison of the information for an object against itself, which may be part of the process to generate the origin score of that object. In some embodiments, the origin engine can partition the information above into at least one subset associated with an origin and one or more subsets not associated with any origin, or for which no origin can be determined.

In some embodiments, the origin engine can determine a consistency metric of the two or more subsets based on a comparison of one or more portions of two or more corresponding datasets in each of the different subsets. The consistency metric may be determined with a comparison of two or more entire subsets (e.g., using corresponding values or metrics that are representative of, or based on, the contents of the corresponding subset). Alternatively, or in addition, the consistency metric of two or more subsets may be determined by a piecewise comparison using the corresponding individual types of data contained in the two or more subsets (e.g., comparing, between the two or more subsets, each of the following: feature variables, digital image data packs, datasets extracted from digital image data packs, etc.). In some embodiments, the consistency metric of two or more subsets may be based on a variance (e.g., variance data or vector) between the two or more subsets (or, for a piecewise comparison, their individual contents).

In some embodiments, the origin engine can determine an internal consistency metric for a single subset (e.g., of the two or more subsets partitioned as described above) based on a comparison of one or more portions of data in the different datasets (e.g., feature variables, digital image data, digital image data packs, etc.) within that same subset. For example, the origin engine may determine an internal consistency metric based on a variance of one or more types of datasets contained in that subset (e.g., a variance of the feature variables, a variance of the digital image packs, etc.). Alternatively, or in addition, the internal consistency metric for a single subset may be determined based on a comparison with an expected variance between two different types of datasets of the subset and an actual, or determined, variance between those same two types of datasets of the subset (e.g., a comparison of an expected variance between a feature variable and a digital image data pack with an actual variance that is determined for that feature variable and digital image data pack within the same subset).

In some embodiments, the origin engine can determine, based on a comparison of the consistency metric of the two or more subsets and the internal consistency metric of a single subset, a confidence score for one or more of the datasets (e.g., one or more feature variables, image data packs, etc.) associated with the object (or its digital image data). For example, in some embodiments, the origin engine can determine a confidence score based on whether either (or both) of the consistency metric of the two or more subsets and the internal consistency metric are less than a threshold. Alternatively, or in addition, the origin engine may determine a confidence score based on a determination that the difference of two consistency metrics does, or does not, exceed a threshold. In some embodiments, the origin engine can determine a confidence score based on the difference between an expected mathematical relation of the consistency metrics and a corresponding actual, or computed, mathematical relation of the consistency metrics.

In various embodiments, one or more artificial intelligence models 229 may be used to evaluate subsets of the set of feature variables, and the outputs of the one or more artificial intelligence models combined to determine a provenance score. Feature variables may be grouped together in various combinations to form subsets that are provided as inputs to different models, and/or to the same model. The feature variables may be grouped together based on their orthogonality (e.g., how correlated they are with respect to each other), as feature variables that are uncorrelated may be more "informative" in the aggregate in terms of determining a provenance metric. For example, if the set of all feature variables includes five feature variables, a first subset may include the first and fourth feature variables, a second subset may include the second and third feature variables, and a third subset may include the fifth feature variable. The first and fourth feature variables may have been grouped into the first subset for being uncorrelated to each other, or otherwise for having a correlation coefficient within a certain threshold (e.g., between 0 and 0.2), and similarly for the second and third feature variables being grouped into the second subset. The fifth feature variable may have been selected as the sole constituent of the third subset, without being grouped with another feature variable, for being the most correlated to the other feature variables (e.g., for having an absolute correlation coefficient of at least 0.5 with every other feature variable). By inputting uncorrelated feature variables into one or more models, the outputs from the model(s), in combination, may at least in certain situations provide a more reliable metric than one output from one model that receives all feature variables at once. In some embodiments, one or more artificial intelligence models 229 may be used to evaluate each feature variable separately, and the outputs of the artificial intelligence models used to determine the authenticity score. The artificial intelligence models 229 may have been trained using supervised, unsupervised, and/or self-supervised machine learning techniques. For example, in a supervised learning example, images with known provenance may be used to train models to use feature variables to classify images of objects for which provenance is not known.

In various embodiments, the system 200 may include a data archive 260 that may be in communication with authentication server 210 via, for example, network 201 and/or other network (e.g., through a local network or through a larger network such as the internet). In some embodiments, data archive 260 may be incorporated with authentication server 210, may be separate from and co-located with authentication server 210, or may be separate from and remote with respect to authentication server 210. Data archive 260 may include comparison image data or other visual information for evaluation of an object. In various embodiments, data archive 260 may include a data storage processor 262 that obtains new data and stores the data in one or more computer-readable storage media, a data search engine 264 that searches for data (e.g., for generation of a response to a data request) stored in the one or more storage media, and a data reader processor 266 that retrieves and provides data that is found by the data search engine 264.

Figure 3:
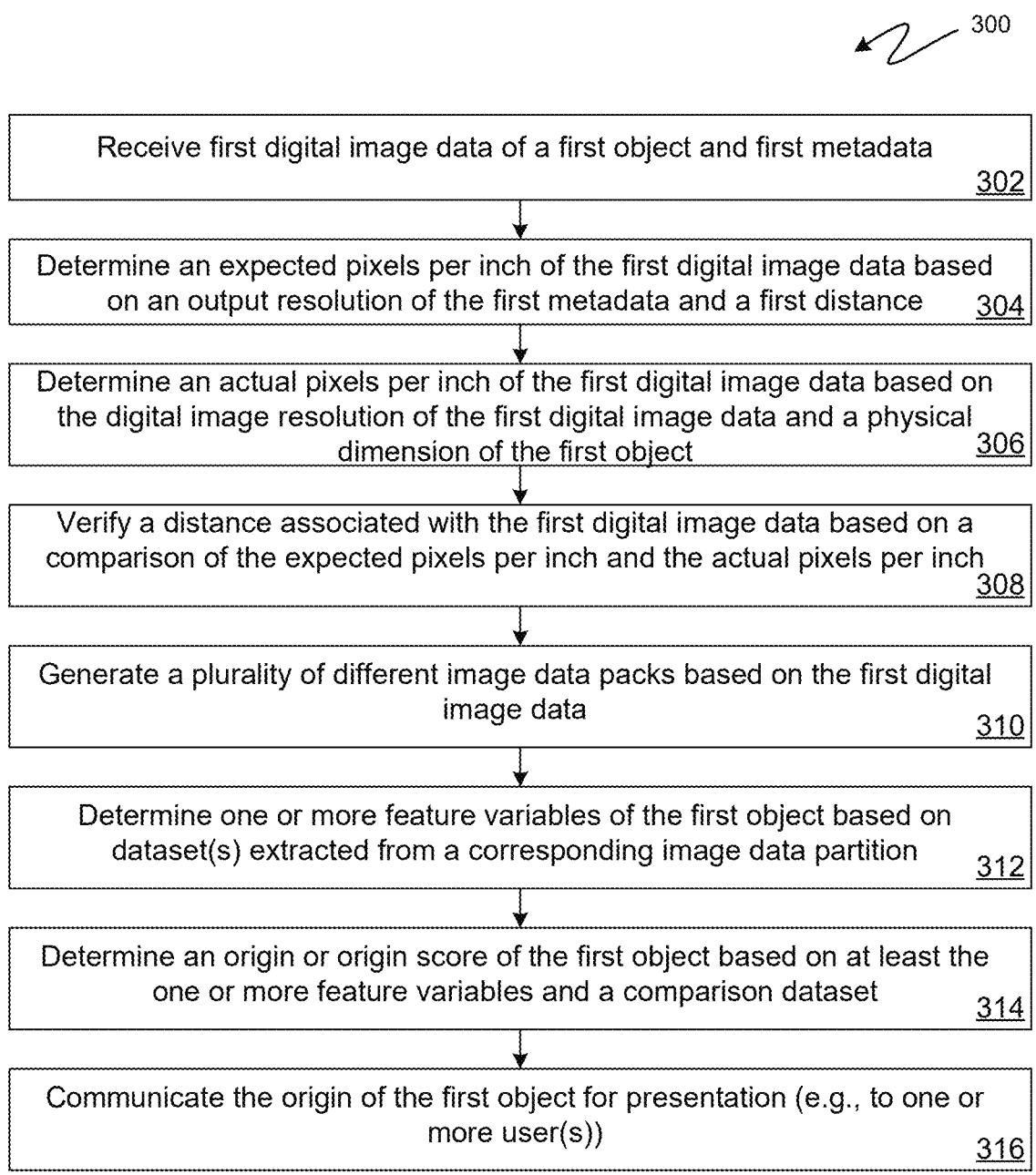
FIG. 3 is a flow diagram of a method of digital image data acquisition, according to one embodiment of the present disclosure.

FIG. 3 depicts an example method of digital image data acquisition for an object authenticity process, according to one embodiment of the present disclosure. The method 300 can be performed, for example, by at least one of the one or more processor(s) 212 of the authentication server 210 depicted in FIG. 2. However, in some embodiments, one or more of the steps may be performed by a different processor, server, or any other computing device (e.g., a processor of one or more client devices 250, 252, and 254 or one or more processors of another server system). For instance, one or more of the steps may be performed via a cloud-based service including any number of servers, which may be in communication (e.g., via network 201) with the client devices 250, 252, 254 or the Authentication Server 210.

At 302 the method 300 can receive first digital image data of a first object and first metadata (e.g., from a client device, including one or more of the client device 120 of FIGS. 1A and 1B or any of client devices 250, 252, or 254 of FIG. 2, or received via a network, including via the network 201 of FIG. 2, etc.). In some embodiments, the first digital image data and the first metadata received at step 302 may include one or more images of the first object at a first distance. In some embodiments, the first metadata can indicate an output resolution associated with the device used to collect the first digital image data (e.g., a number of megapixels for the digital images of the digital image data).

At 304 the method 300 can determine an expected pixels per inch of the first digital image data based on an output resolution of the first metadata and a first distance.

At 306 the method 300 can determine an actual pixels per inch of the first digital image data, (e.g., an actual pixels per inch of one or more digital images collected at the first distance) based on the digital image resolution of one or more digital images captured at the first distance of the first digital image data and a physical dimension of the first object. For example, at 306 the method may determine the actual pixels per inch using one or more of a width, a height, or any other physical dimensions for the object.

At 308 the method 300 can verify a distance associated with one or more digital images of the first digital image data based on a comparison of the expected pixels per inch and the actual pixels per inch. For example, the method may determine, at step 308, that a difference of the expected pixels per inch and the actual pixels per inch is less than a specified maximum difference.

At 310 the method 300 can generate a plurality of different image data packs based on the digital image data of the first object. For example, at step 310, the method 300 can generate a plurality of different image data packs that includes at least a color image data pack, a volumetric image data pack, and a calligraphic image data pack.

At 312 the method 300 can determine one or more feature variables of the first object and based on one or more dataset(s) extracted from a corresponding image data pack of the plurality of different image data packs. For example, at 312, the method 300 can generate one or more of different feature variables of the first object, which may include a combination of one or more of the feature variables described previously in greater detail (e.g., described with reference to the feature variable datasets 226 of FIG. 2).

At 314 the method 300 can determine an origin (or an origin score) of the first object based on at least the one or more feature variables determined for the first object and a comparison dataset based on a plurality of additional objects. For example, at step 314, the method 300 may perform one or more of the operations described above for the provenance engine 240 of FIG. 2.

At step 316, the method 300 can communicate (e.g., via a network) an indication of the origin, origin score, authenticity score, or the like of the first object to one of more client devices. The method 300 may communicate the origin, origin score, authenticity score, or the like for presentation (e.g., display) such as to one or more users (e.g., of the client devices).

Although the steps are shown in FIG. 3 having a particular order, it is intended that the steps may be performed in any order. It is also intended that some of these steps may be optional. The method 300 may be include executing the steps in any manner to determine an origin of an object based on digital image data of the object and a comparison dataset based on a plurality of additional objects.

Figure 4A:
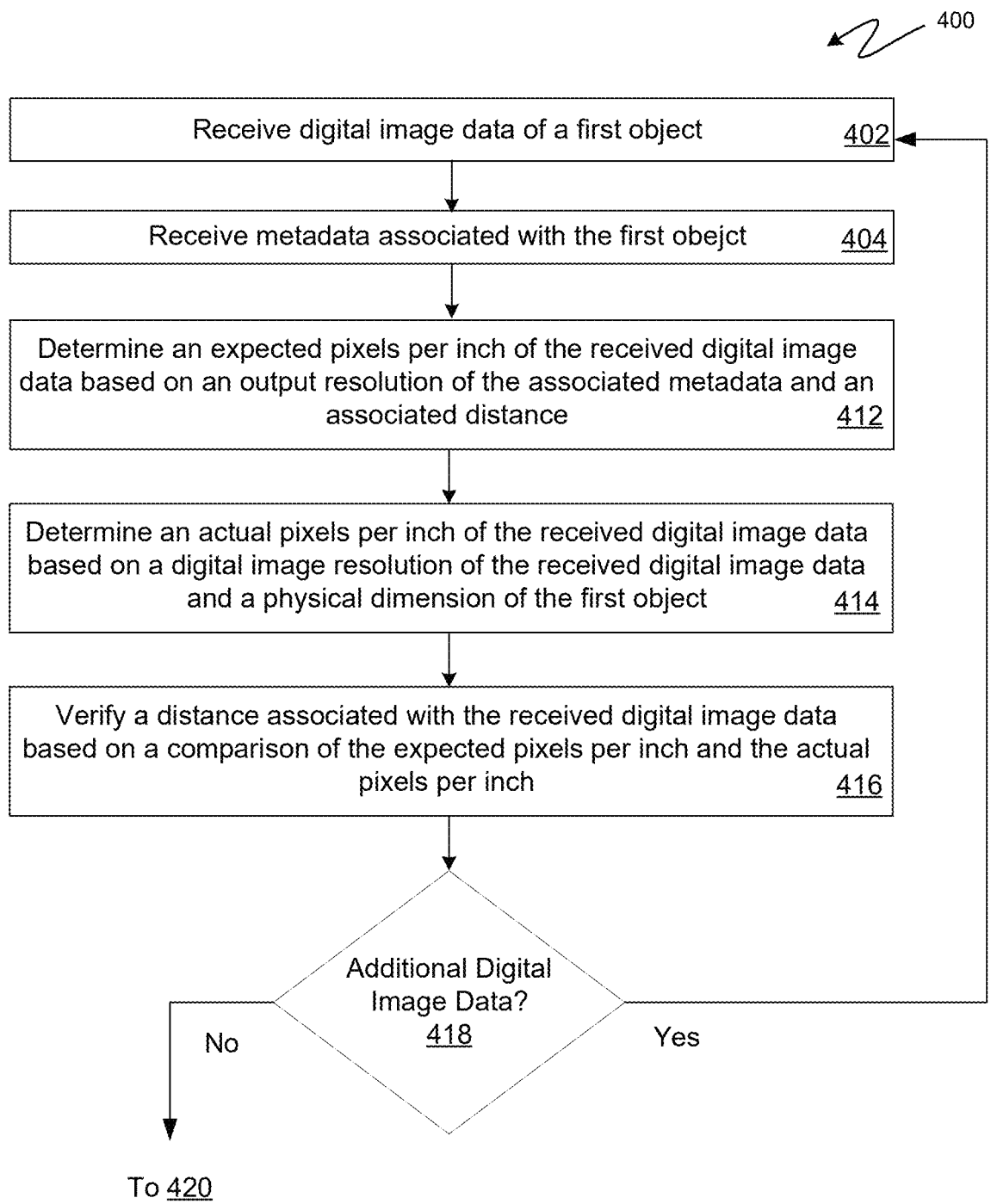
FIG. 4A is a flow diagram of a method to generate an object origin score, according to one embodiment of the present disclosure.

FIG. 4A is a flow diagram of a method 400 to determine an origin or generate an origin score or authenticity score for an object using digital image data of the object and a comparison dataset, according to one embodiment of the present disclosure. The method 400 can be performed by at least one or more of the processor(s) of an authentication server (e.g., any, or all, of the one or more processors 212 of server 210, described above with reference to FIG. 2). However, in some embodiments, one or more of the steps may be performed by a different processor, server, or any other computing device(s), including, for example, one or more of the client devices 250, 252, and 254 of FIG. 2, a second authentication server (not shown in FIG. 2), one or more devices of a remote (e.g., cloud, remote, and/or third-party) computing system, and the like. For instance, in some embodiments, one or more of the steps of method 400 may be performed via a cloud-based service including any number of servers, which may be in communication with (e.g., via network 201), and may be configured identically to, the authentication server 210 and/or one or more of the client devices 250, 252, and 254.

Although the steps are shown in FIG. 4A with a particular order, in some embodiments, the steps of method 400 may be performed in any order. It is also intended that some of the steps of method 400 may be optional. For example, in some embodiments of the methods according to the present disclosure may modify, replace, or omit entirely, one or more of the steps 402, 404, 412, 414, 416, and 418. The method 400 may be executed (e.g., via one or more engine (s) and processor(s) of a computing device (e.g., the authentication server 210), as described above with reference to FIG. 2) to determine an origin of an object from digital image data of the object and a comparison dataset based on a plurality of additional objects The method 400 can include repeating any of the operations at 402, 404, 412, 414, 416, and 418 with each digital image data (and associated metadata) to be received as part of method 400, which may include any suitable number of repetitions, to receive any number of digital image data, as described herein. For example, the method 400 can repeat each of 410, 412, 414, and 416 with each digital image data (and associated metadata) to be received. In one embodiment, method 400 can repeat 402, 404, 412, 414, and 416 for first digital image data, second digital image data, third digital image data, fourth digital image data, and so on, which may continue until all digital image data (and associated metadata) has been received.

At 402 and 404, the method 400 can receive digital image data of a first object and can receive associated metadata (e.g., from a client device, including one or more of the client device 120 of FIGS. 1A and 1B or any of client devices 250, 252, or 254 of FIG. 2, or received via a network, including via the network 201 of FIG. 2, etc.). For example, at 402 and 404 the method can receive second digital image data and associated metadata (e.g., second associated metadata), which may be after determining, at 418, to receive additional digital image data by repeating method 400. In some embodiments, the received digital image data and the associated metadata, which may are received at 402 and 404, may include one or more images of the first object at a first distance. In some embodiments, the associated metadata can indicate an output resolution associated with the device used to collect the received digital image data (e.g., a number of megapixels for the digital images of the received digital image data).

At 412, the method 400 can determine an expected pixels per inch of the received digital image data based on an output resolution of the associated metadata (e.g., for the received digital image data) and an associated distance. In some examples, the associated distance may be any of a first, second, third, or fourth distance, which may each correspond to a first, second, third, or fourth digital image data, respectively.

At 414, the method 400 can determine an actual pixels per inch of the received digital image data, (e.g., an actual pixels per inch of one or more digital images collected at the associated distance) based on the digital image resolution of one or more digital images captured at the associated distance of the received digital image data and a physical dimension of the first object. For example, at 414 the method 400 may determine the actual pixels per inch of the received digital image data using one or more of a width, a height, or any other physical dimension of the object or a portion thereof.

At 416, the method 400 can verify a distance associated with one or more digital images of the received digital image data (e.g., of the digital image data received for that repetition of 410, 412, 414, and 416) based on a comparison of the expected pixels per inch (e.g., as determined at 412) and the actual pixels per inch (e.g., determined at 414). For example, the method 400 may determine, at step 416, that a difference of the expected pixels per inch and the actual pixels per inch is less than a specified maximum difference and, as a result, verify the distance associated with the received digital image data (or one or more digital images of the received digital image data) substantially matches an associated distance or expected distance associated with that received digital image data.

In some embodiments, method 400 includes receiving (e.g., via a communications network), a second digital image data and associated metadata or second metadata (e.g., at 402 and 404) and in response to determining, at 418, that additional digital image data will be received). For example, the second digital image data can capture the first object at a second distance and with an output resolution associated with the second digital image data. Additionally, the received second associated metadata (or associated metadata of the second digital image data) can include a file identifier that indicates an originality of the received second digital image data. For example, the file indicator of the second associated metadata can indicate that the second digital image data does not reflect, or contain, image data that was changed with, or output by, the operation of an electronic image editor (e.g., image editing software).

Some examples of method 400 further include receiving, via the communications network, a third digital image data and a third metadata or associated metadata of the third digital image data (e.g., at 402 and 404) and in response to determining, at 418, that additional digital image data will be received). The third digital image data can capture the first object at a third distance, which may differ from the first and second distances (e.g., at a smaller distance from, or closer to, the first object). And, in some instances, the received third metadata includes an output resolution associated with the third digital image data (e.g., an imaging resolution of the device used to capture the third digital image data) and a file identifier indicative of an originality of the third digital image data For example, the file indicator of the second digital image data can indicate that the second digital image data does not reflect, or contain, image data that was changed with, or output by, the operation of electronic image editing of any kind (e.g., image editing software).

In still other examples, method 400 can receive, via the communications network, a fourth digital image data and a fourth associated metadata (e.g., at 402 and 404) and in response to determining, at 418, that additional digital image data will be received), which may capture the first object at a fourth distance. The fourth associated metadata can include an output resolution associated with the fourth digital image data and a file identifier indicative of an originality of the fourth digital image data. And, in some examples, the method 400 can generate, based on the first, second, third, and fourth digital image data, a plurality of separate image datasets and determine one or more feature variables of the object to be authenticated. In some examples, the received fourth digital image data can comprise digital image data capturing a back, or rear, side of the first object (e.g., a portion of the surface of the object, which is opposite a front, or painted, surface of the object).

Figure 4B:
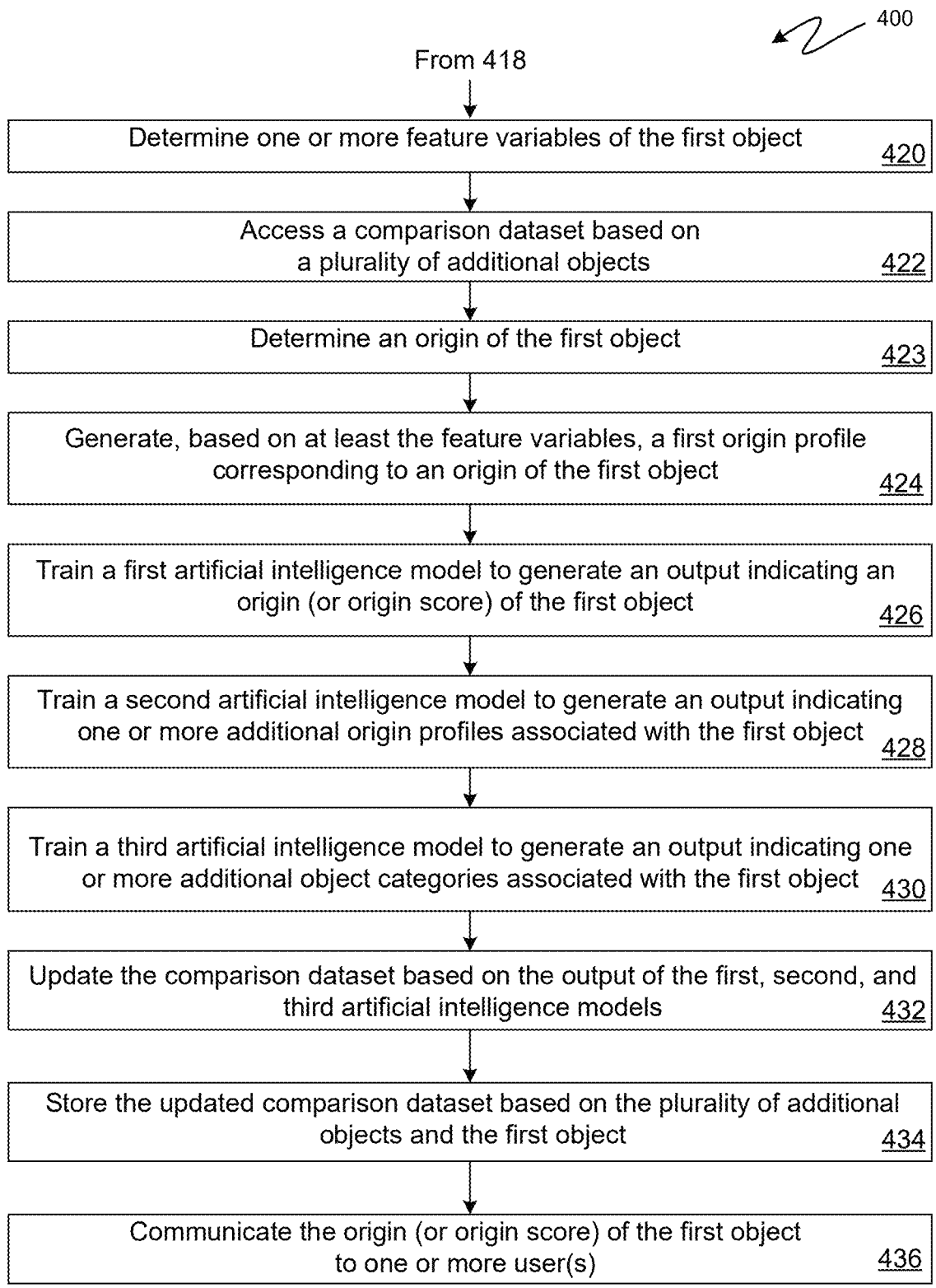
FIG. 4B is a flow diagram of a method to generate an object origin score, according to one embodiment of the present disclosure.

FIG. 4B is a flow diagram of a method to determine a provenance for an object using digital image data of the object and a comparison dataset, according to one embodiment of the present disclosure. The method 400 can be performed by at least one or more of the processor(s) of a computing device (e.g., an authentication server, any, or all, of the one or more processors 212 of server 210, described above with reference to FIG. 2). However, in some embodiments, one or more of the steps may be performed by a different processor, server, or any other computing device(s), including, for example, one or more of the client devices 250, 252, and 254 of FIG. 2, a second authentication server (not shown in FIG. 2), one or more devices of a remote (e.g., cloud, remote, and/or third-party) computing system, and the like. For instance, in some embodiments, one or more of the steps of method 400 may be performed via a cloud-based service including any number of servers, which may be in communication with (e.g., via network 201), and may be configured identically to, the authentication server 210 and/or one or more of the client devices 250, 252, and 254.

Although the steps are shown in FIGS. 4A and 4B with a particular order, in some embodiments, the steps of method 400 may be performed in any order. It is also intended that some of the steps of method 400 may be optional. For example, in some embodiments of the methods according to the present disclosure may modify, replace, or omit entirely, one or more of the steps 402, 404, 412, 414, 416, 418, 420, 422, 424, 426, 428, 430, 432, 434, and 436. The method 400 may be executed (e.g., via one or more engine(s) and processor(s) of authentication server 210, as described above with reference to FIG. 2) to determine an origin of an object from digital image data of the object and a comparison dataset based on a plurality of additional objects.

As described above, with reference to FIG. 4A, at steps 402, 404, and 412-418, the method 400 can receive digital image data of a first object. For example, step 402 may include receiving first digital image data of the first object according to one or more of the operations of the authentication server 210 and the image data processors 232, which are described in greater detail above with reference to FIG. 2.

At step 420, the method 400 can determine one or more feature variables of the first object. For example, the method can determine a combination of one or more of the different feature variables described with reference to feature variable datasets 226 of FIG. 2. In some examples, at 420 the method 400 can determine the one or more feature variables of the first object based one or more different digital image data received during one or more repetitions of the portion of method 400 shown in FIG. 4A and described above. For example, at 420 the method 400 may, in one example, determine a plurality of feature variables of the first object based on first, second, third, and fourth digital image data of the first object, which were each received at respective iterations of 410 of the method 400.

At step 422, the method 400 can access a comparison dataset, or one or more set(s) of comparison data, which may include a plurality of feature variable datasets, including a feature variable dataset corresponding to the each of the plurality of additional objects. For example, the one or more sets of comparison data (e.g., the comparison dataset) may comprise a plurality of digital image files of the first object, each image file of the plurality of image files comprising image data of the first object. In some examples, the one or more sets of comparison data can include one or more digital images of additional objects, which share one or more of the feature variables generated for the first object (e.g., that are associated with feature variables substantially similar to those generated for the first object at 422 of method 400).

In still other examples, method 400 includes partitioning, by the one or more processors and using two or more subsets, each of the following: one more feature variables of the first object, the plurality of different image data packs (e.g., as described above with reference to FIG. 3), the one or more datasets extracted from an image data pack (e.g., as described above with reference to FIG. 4A), and the received digital image data (e.g., all digital image data received for the first object). More specifically, in some of those examples, method 400 may determine an external consistency metric of the two or more subsets based on a comparison of one or more portions of two or more corresponding datasets in each of the different subsets. And, in some of those same examples, the method 400 can determine an internal consistency metric for a single subset (e.g., of the two subsets) based on a comparison of one or more portions of data within the same subset; and determine, based on a comparison of the external consistency metric and the internal consistency metric, a confidence score for one or more datasets associated with the digital image data of the first object. For example, the method 400 can include determining the confidence score for one or more datasets for a specific origin associated with the first object (e.g., to authenticate the first object based on data associated with that specific origin).

In some examples, the method 400 can, at 423, determine a first origin associated with the first object. At step 423, the method 400 can receive a plurality of characteristics of one or more additional objects associated with the first origin. The method 400 can determine, according to the one or more feature variables determined for the object and a comparison dataset associated with a plurality of additional objects, an origin for the object. Additionally, some examples of method 400 determine the first origin based on the received plurality of characteristics of one or more additional objects and respective origin(s) of (or origin profiles associate with) the one or more additional objects. In an aspect, the method 400, at step 423, can include comparing the feature variables of the first object determined at 420 with feature variables of the one or more additional objects, and determining the origin of the first object based on the comparison. In an aspect, the method 400 can include using or otherwise involving one or more artificial intelligence models to determine the origin of the first object based on at least one or more feature variables of the first object and the comparison dataset. The one or more artificial intelligence models can include one or more machine learning models trained to generate an output based on one or more matching portions of the results for a digital image dataset of an object (e.g., one or more feature variables, one or more origin profiles, one or more object categories, or digital image data, etc.) and of the comparison dataset (e.g., one or more corresponding feature variables, origin profile(s), object categories, or digital image data). In an aspect, the artificial intelligence models can include an artificial intelligence model trained to identify feature variables that are present in the comparison dataset. The feature variables of the object can then be compared to the feature variables of one or more additional objects in the comparison dataset.

At step 424, the method 400 can generate, based on at least the first feature variable(s) of the first object, a first origin profile of an origin of the first object. For example, step 424 can include generating an origin profile according to the description provided with regard to the origin profiles 227 of the authentication server 210, described above in greater detail with reference to FIG. 2.

At step 426, the method 400 can train or update a first artificial intelligence model to generate an output indicating an authenticity score of the first object, or if already available, to obtain or access a trained first artificial intelligence model (e.g., for use and/or for additional training). For example, step 410 can include training an artificial intelligence model, with input including the feature variables of the first object and a comparison dataset, to generate an output indicating an authenticity score, or otherwise authenticate, the first object. For example, the method 400 may train the first artificial intelligence model to output an authenticity of the first object (e.g., at 426) according to the operations of the provenance engine 240, which is described above with reference to FIG. 2.

At step 428, the method 400 can train or update a second artificial intelligence model to generate an output indicating one or more origin profiles that are associated with one or more of the first origin and the first object, or if already available, to obtain or access a trained second artificial intelligence model (e.g., for use and/or for additional training). For example, the second artificial intelligence model may be trained to generate an output based on the feature variables generated for the first object and the one or more sets of comparison data accessed at 420.

At step 430, the method 400 can train or update a third artificial intelligence model to generate an output indicating one or more additional object categories associated with the first object or with an origin of the first object, or if already available, to obtain or access a trained third artificial intelligence model (e.g., for use and/or for additional training). For example, the second artificial intelligence model may be trained to generate an output based on the feature variables generated for the first object and the one or more sets of comparison data accessed at 422

At step 432, the method 400 can update the comparison dataset based on the output of the first, second, and third artificial intelligence models. For example, the method 400 may update the one more sets of comparison data accessed at 422 based on the outputs generated by the artificial intelligence model(s) trained at each of 426, 428, and 430.

At step 434, the method 400 can store the updated comparison dataset, or updated one or more sets of comparison data, based on both a plurality of additional objects (e.g., the plurality of additional objects associated with the one or more sets of comparison data accessed at 422) and the first object.

At step 436, the method 400 can communicate, via a network, the origin of the first object (e.g., an origin estimation, origin score, or other provenance result) to one or more users or client devices. For example, step 436 may include communicating an origin score of the first object as described above with reference to the operation of server 210 after generating an origin score via one or more artificial intelligence models of the provenance engine 240, as described in greater detail above with reference to FIG. 2.

In various embodiments, determining provenance metrics for an object can use one or more artificial intelligence models trained to receive image data corresponding to various features (e.g., see FIGS. 5-7), and/or to receive other data, and to provide various outputs indicative of provenance (e.g., "yes authentic" or "not authentic" with a certain confidence score, origin likelihood between zero and 1, etc.). Various outputs can be processed to obtain a desired output, such as an origing score (e.g., between zero and 100) or a category ("fraudulent", "authentic", etc.) to be provided to a user.

Figure 6:
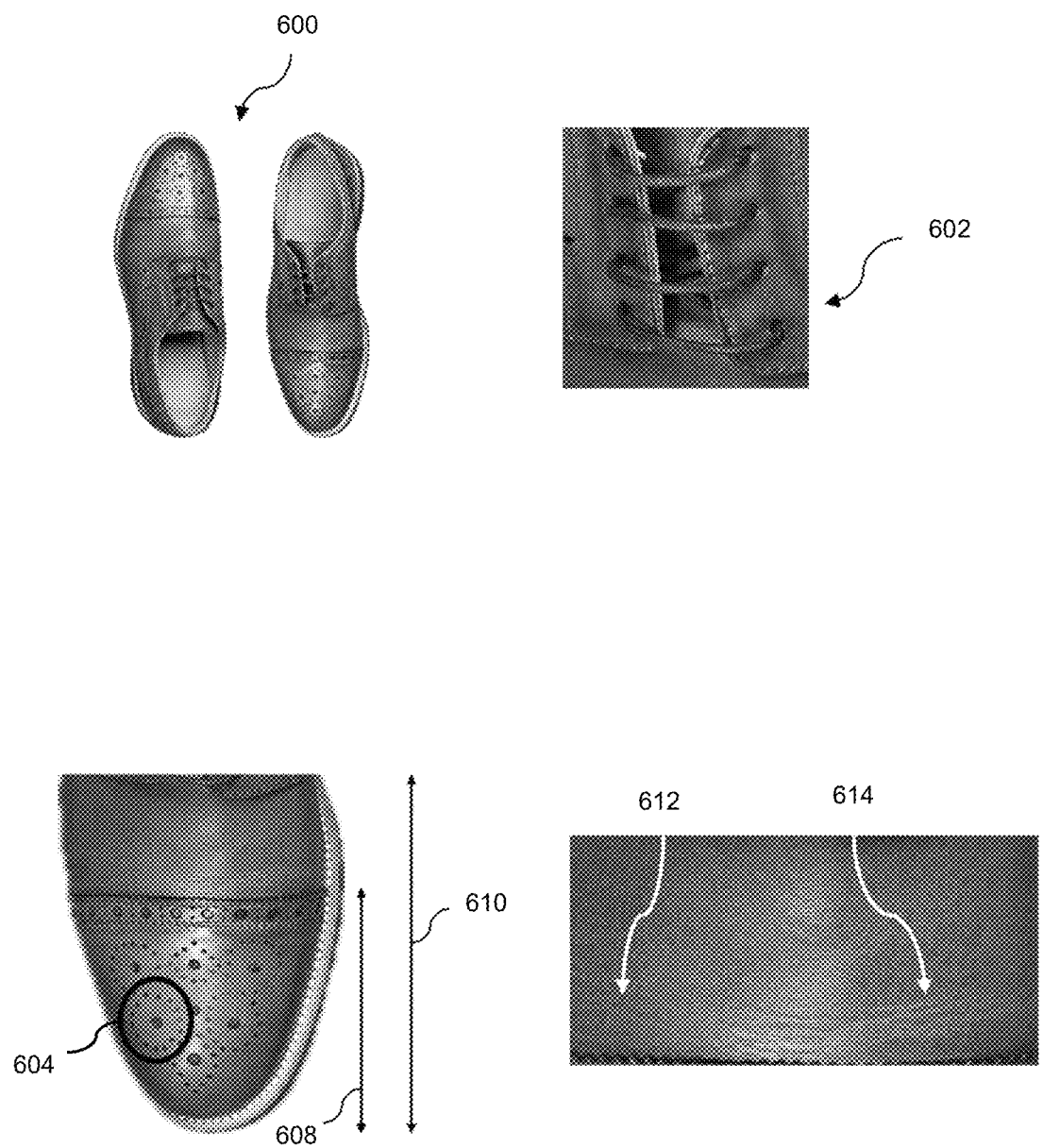
FIG. 6 depicts additional example object features captured in image data of the object, according to one embodiment of the present disclosure.
Figure 7:
FIG. 7 depicts additional example object features captured in image data of the object, according to one embodiment of the present disclosure.

FIG. 5, FIG. 6, and FIG. 7 depict example whole objects and detailed, or zoomed in, portions of the objects for extraction datasets. The extraction datasets may each be extracted from the image data of an object or from a volumetric image data pack, in accordance with present implementations. In different embodiments, although image data corresponding to an entirety of an object may be used, the image data may be from one or more perspectives and need not necessarily include all surfaces of the object. The features of objects may correspond to, for example, shapes, textures, materials, grains, creases, or cracks in material used to make the object, and/or dimensions such as length, height, weight, volume, or angles between components of the object.

In FIG. 5, an example handbag 500 may have components that are more relevant to provenance than others. For example, the shape of a buckle or clasp 502, the shape and/or stitching (e.g., density and size of stiches) of a patch 504 or other portion of the handbag, angles 516 and height 520 of handles or other components, the grain 510 of the leather or other material, and shapes 512 and 514 of decorative elements (e.g., number of shapes, variation among shapes, etc.). In FIG. 6, an example footwear 600 may have features related to its laces 602 (e.g., the number and size of the laces), patterns of indentations 604, distances 608, 610 between sections of the footwear, and cracks 612, 614 in the material. In FIG. 7, a dress 700 may have certain features such as shape or texture of sequins 704 and optical features 706 due to various from components (e.g., reflectivity, shine, coloration, etc.). With respect to belt 720, features may relate to a buckle 722 (e.g., shape, material, etc.), distance 726 between the buckle and a loop of the belt.

Figure 8A:
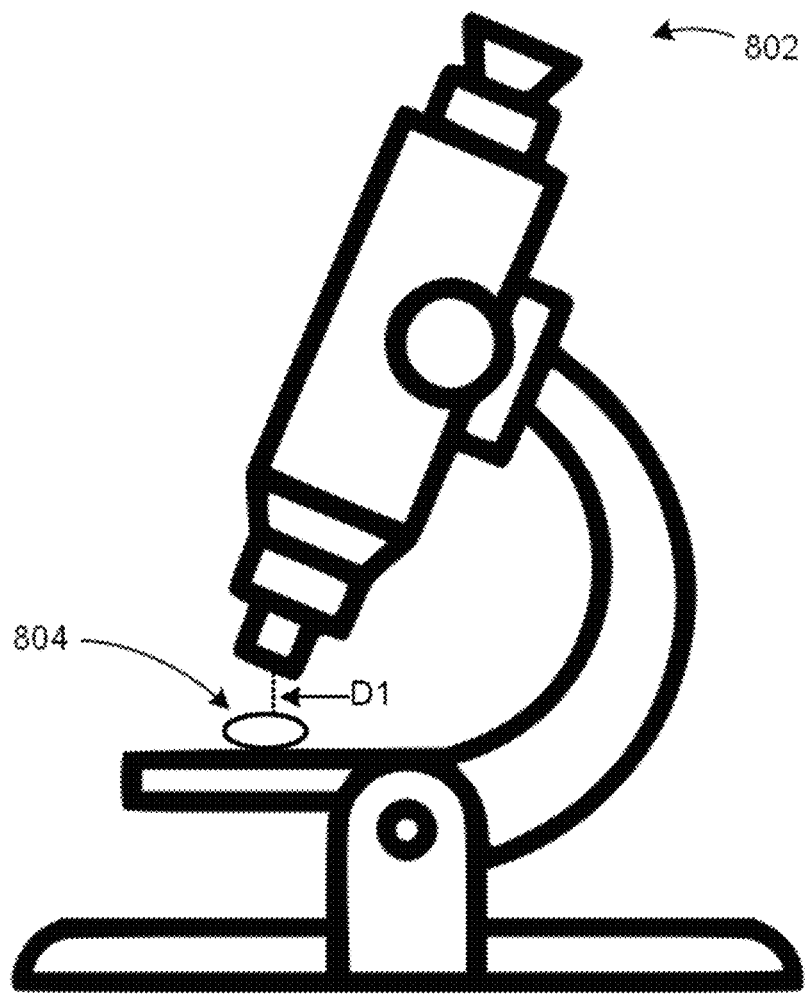
FIG. 8A is an example of acquiring digital image data of an object at a first distance, according to one embodiment of the present disclosure.

FIG. 8A is an example of acquiring digital image data of an object 804, via a microscope 802, at a first distance D1, according to one embodiment of the present disclosure. The microscope 804, is an example of a client device and is configured to capture a digital image dataset (e.g., a plurality of digital images and associated metadata) of the object 804 from a first distance D1. The digital image dataset (e.g., digital image data comprising first digital image data, second digital image data, third digital image data, fourth digital image data, etc. and associated metadata respectively) can be used for an authentication of, or the generation of a provenance score for, the object 804 and/or of the authenticity of an origin of the object 804. Relatedly, the microscope 802 can capture image data of the object 804 at the first distance D1 with a first magnification or a first degree of magnification, which is less than the second magnification used in the embodiment of FIG. 8B.

Figure 8B:
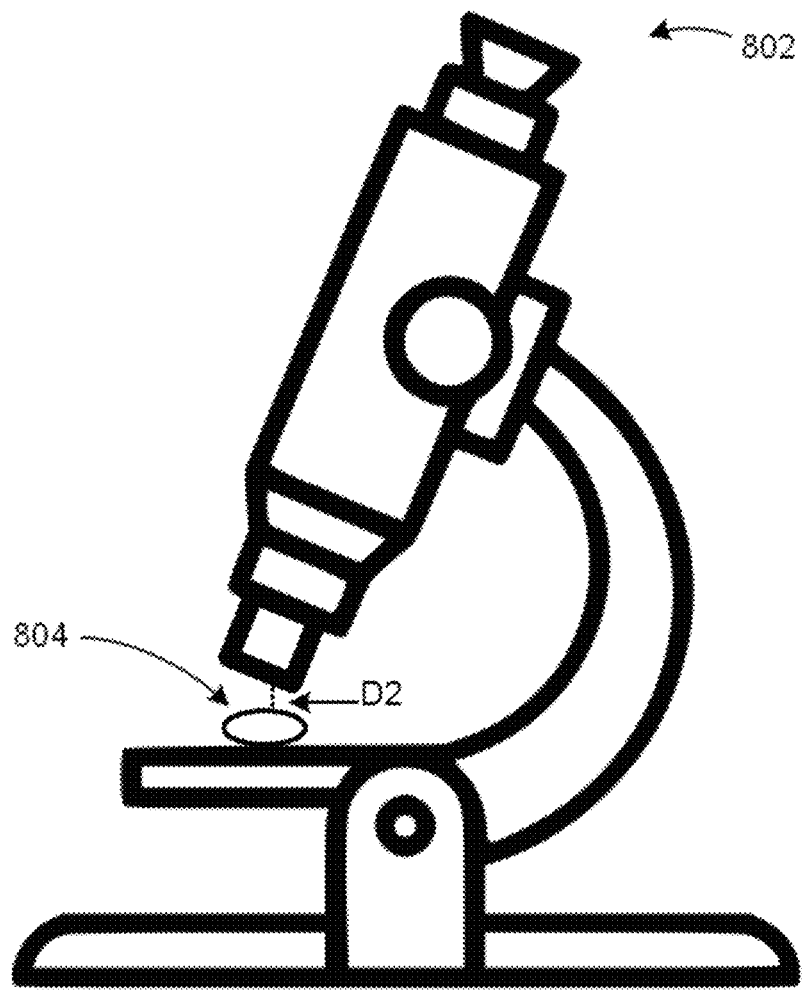
FIG. 8B is an example of acquiring digital image data of an object at a second distance, according to one embodiment of the present disclosure.

FIG. 8B is an example of acquiring digital image data of an object 804, via a microscope 802, at a second distance D2, according to one embodiment of the present disclosure. The microscope 804, is an example of a client device and is configured to capture a digital image dataset (e.g., a plurality of digital images and associated metadata) of the object 804 from a second distance D2. The digital image dataset (e.g., digital image data comprising first digital image data, second digital image data, third digital image data, fourth digital image data, etc. and associated metadata respectively) can be used for an authentication of, or the generation of a provenance score for, the object 804 and/or of the authenticity of an origin of the object 804. Relatedly, the microscope 802 can capture image data of the object 804 at the second distance D2 with a second magnification or a second degree of magnification, which is greater than the first magnification used in the embodiment of FIG. 8A. In other embodiments, however, the magnification used by the microscope 804, or any other client device, need not be limited to any set number of magnification. Accordingly, the microscope 802, or any other client device, may use any suitable magnification, or any suitable number of different magnifications and/or distances, based on the applicable type of digital image data sought and the type of object to be imaged.

Some embodiments of the present disclosure can include a method for determining an provenance score for an object. In some embodiments the method can include capturing, by a digital imaging device, a first digital image file of a first object. In some embodiments, the first digital image file comprises first digital image data collected at a first distance and first metadata comprising an output resolution of the digital imaging device and a file identifier indicative of an originality of the digital image data. The method can include determining, by the one or more processors, an expected pixels per inch of the first digital image data based on the output resolution of the first metadata and the first distance. The method can include determining, by the one or more processors, an actual pixels per inch of the first digital image data based on a digital image resolution of the first digital image data and a dimension of the first object. Additionally, the method may include verifying, by the one or more processors, the first distance of the first digital image file by determining that a difference between the expected pixels per inch for the first digital image data and the actual pixels per inch of the first digital image data is below a threshold.

The method can include generating, by the one or more processors and based on the first digital image data, a plurality of separate image packs comprising a color data image pack, a volumetric data image pack, and a calligraphic data image pack. The method can also include extracting, by the one or more processors and from one or more of the plurality of separate image packs, a plurality of extraction datasets of the first object. The method can also include determining one or more feature variables of the object based on the plurality of extraction datasets and receiving one or more sets of comparison data comprising additional image data associated with the first object. Additionally, the method may include determining a provenance score for the first object based on at least the determined one or more characteristics of the first object and the received comparison data and indicating a probability for the provenance of the first object based on a determination that the provenance score for the first object is greater than a threshold.

Additionally, some embodiments of the method can include capturing, by the digital imaging device, a second digital image file for the first object at a second distance, wherein the second digital image file comprises second digital image data and second metadata comprising an output resolution of the digital imaging device and a file identifier indicative of an originality of the second digital image data. The method can include capturing, by the digital imaging device, a third digital image file for the first object at a third distance, and wherein the third digital image file comprises third digital image data and third metadata comprising an output resolution of the digital imaging device and a file identifier indicative of an originality of the third digital image data. And the method can include generating, by the one or more processors and based on the digital image data of the first, second, and third digital image files, the plurality of separate image datasets.

Additionally, some embodiments of the method can further include capturing, by the digital imaging device, a fourth digital image file for the first object at a fourth distance, wherein the fourth digital image file comprises fourth digital image data and fourth metadata comprising an output resolution of the digital imaging device and a file identifier indicative of an originality of the fourth digital image data. And the method can include generating, by the one or more processors and based on the digital image data of the first, second, third, and fourth digital image files, the plurality of separate image datasets. the calligraphy extraction dataset.

Another example of the present disclosure can include methods and/or systems to perform three levels of analysis to determine an object origin. Some examples may include a first level of analysis that comprises a physical comparison, which includes a confrontation of the object and/or image data of the object with previously captured image data of the same object (e.g., archived image data of the same object). Some examples may further include a second level of analysis that comprises a physical and pattern pool comparison, including a confrontation of the object and/or image data of the object with image data of other objects, or additional objects, that are associated with the same origin, author, or any other characteristic as the object for which an origin is to be determined. Additionally, some examples may include a third level of analysis that is a social and environment comparison of the object, including a confrontation with image data of one or more additional objects associated with one or more overall, or high-level, categories that are also associated with the object for which an origin is to be determined. For example, the third level of analysis can include a confrontation of the object to be authenticated, or the image data of that object, with image data of one or more additional objects of the same object type (e.g., for an object that is a ruby, a confrontation with image data of one or more additional objects that are also rubies, etc.).

Having now described some illustrative implementations, the foregoing is illustrative and not limiting, having been presented by way of example. In particular, although many of the examples presented herein involve specific combinations of method acts or system elements, those acts and those elements may be combined in other was to accomplish the same objectives. Acts, elements and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items. References to "is" or "are" may be construed as nonlimiting to the implementation or action referenced in connection with that term. The terms "is" or "are" or any tense or derivative thereof, are interchangeable and synonymous with "can be" as used herein, unless stated otherwise herein.

Directional indicators depicted herein are example directions to facilitate understanding of the examples discussed herein, and are not limited to the directional indicators depicted herein. Any directional indicator depicted herein can be modified to the reverse direction, or can be modified to include both the depicted direction and a direction reverse to the depicted direction, unless stated otherwise herein. While operations are depicted in the drawings in a particular order, such operations are not required to be performed in the particular order shown or in sequential order, and all illustrated operations are not required to be performed. Actions described herein can be performed in a different order. Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Scope of the systems and methods described herein is thus indicated by the appended claims, rather than the foregoing description. The scope of the claims includes equivalents to the meaning and scope of the appended claims.

What is claimed is:

1. A system to determine an object origin, comprising:
one or more processors to:
receive, via a network, first digital image data of an object, the first digital image data captured at a first distance and comprising a digital image of an entirety of the object;
generate, based on at least the first digital image data, a plurality of image data packs, the plurality of image data packs comprising at least one of a color feature data pack, a volumetric feature data pack, or a surface feature data pack;
determine one or more feature variables of the object based on one or more image data packs from the plurality of image data packs, each of the one or more feature variables corresponding to a characteristic of the object;

determine, using one or more machine-learning models and according to the one or more feature variables and a comparison dataset associated with a plurality of additional objects, an origin for the object; and communicate, via the network, an indication of the origin of the object.

2. The system of claim 1, wherein the one or more processors are further configured to:

receive, via the network, second digital image data comprising digital image data of the object captured at a second distance; and generate the plurality of image data packs based on the first digital image data and the second digital image data.

3. The system of claim 2, wherein the one or more processors are further configured to:

receive, via the network, third digital image data including one or more images of the object capture from an angle different from an angle at which the first digital image data is captured; and generate the one or more image datasets based on the first set of digital images, the second set of digital images, and the third set of digital images.

4. The system of claim 2, wherein the one or more processors are further configured to:

receive, via the network, third digital image data comprising one or more digital images of a rear side of the object; and generate the plurality of different image data packs based on the first digital image data, the second digital image data, and the third digital image data.

5. The system of claim 1, wherein the comparison dataset further comprises a plurality of digital image datasets and corresponding feature variable datasets for each additional object of the plurality of additional objects.

6. The system of claim 5, wherein the comparison dataset further comprises a plurality of additional origin profiles, each of the additional origin profiles corresponding to an additional object of the plurality of additional objects.

7. The system of claim 5, wherein the additional origin profiles are determined based on the digital image data of one or more objects with a known geographic origin.

8. The system of claim 1, wherein the object comprises one or more of:

a precious stone; and a precious metal.

9. The system of claim 1, wherein the object is one of:

an artisanal work; and a simi-artisanal work.

10. The system of claim 1, wherein the object is one of:

a coin;

a watch;

an automobile; and a luxury good.

11. The system of claim 1, wherein the one or more processors are further configured to:

partition, into two or more subsets, each of the following: one more feature variables of the object, the plurality of different image data packs and the first digital image data;

determine an external consistency metric of the two or more subsets based on a comparison of one or more portions of two or more corresponding datasets in each of the different subsets;

determine an internal a consistency metric for a single subset based on a comparison of one or more portions of data within the same subset; and determine, based on a comparison of the external consistency metric and the internal consistency metric, a confidence score for one or more datasets associated with the digital image data of the object.

12. The system of claim 1, wherein the one or more processors are further configured to:

generate an origin profile of a first origin associated with the object, the origin profile to correspond to one or more additional objects associated with the first origin, one or more origin profiles of one or more associated additional objects, one or more associated geographic locations, and one or more associated object categories; and determine the origin for the object based on a comparison of the one or more feature variables determined for the object, the first origin profile, and the comparison dataset based on the plurality of additional objects.

13. The system of claim 12, wherein the one or more processors are further configured to:

determine an object category associated with the object;

identify a one or more additional objects associated with the object category;

generate a second origin profile of a second origin based on the one or more objects associated with the second origin; and wherein determining the origin for the object is based on the first origin profile, the second origin profile, and the comparison dataset.

14. The system of claim 1, wherein one of the one or more feature variables of the object comprises an inclusions dataset of the object.

15. The system of claim 1, wherein one of the one or more feature variables of the object comprises a color dataset of the object.

16. The system of claim 1, wherein the one or more processors are further configured to:

receive first metadata associated with the first digital image data, the first metadata including an output resolution and one or more originality identifiers indicative of an originality of the first digital image data;

determine an expected pixels per inch of the first digital image data based on the output resolution of the first metadata and the first distance;

determine an actual pixels per inch of the first digital image data based on the output resolution and a physical dimension of the object; and verify the first distance equals an expected distance based on a comparison of the expected pixels per inch and the actual pixels per inch of the first digital image data.

17. A method to ascertain provenance of an object, the method comprising:

receiving first digital image data of an object, the first digital image data collected by an imager at a first distance and comprising a digital image of an entirety of the object;

generating, based on at least the first digital image data, a plurality of image datasets;

determining one or more feature variables of the object based on one or more image datasets from the plurality of image datasets, each of the one or more feature variables corresponding to a characteristic of the object;

determining an origin for the object in accordance with the one or more feature variables determined for the object and a comparison dataset associated with a plurality of additional objects, the comparison dataset comprising origin profiles corresponding to the plurality of additional objects; and communicating, for eventual presentation, an indication of the origin of the object.

18. The method of claim 17, further comprising:

receiving second digital image data a comprising digital image data of the object collected by an imager at a second distance; and generating the plurality of image datasets based on the first digital image data and the second digital image data.

19. The method of claim 17, further comprising:

receiving third digital image data including one or more images of the object capture from an angle different from an angle at which the first digital image data is captured; and generating the plurality of image datasets based on the first digital image data, the second digital image data, and the third digital image data.

20. The method of claim 17, further comprising:

receiving a third digital image data comprising one or more digital images of a rear surface of the object; and generating the plurality of image datasets based on the first digital image data, the second digital image data, and the third digital image data.

21. The method of claim 20, wherein the third digital image data comprises digital image data for less than the entire rear surface of the first object and digital image data of a side portion of the object.

22. The method of claim 17, wherein the comparison dataset further comprises a plurality of digital image datasets and corresponding feature variable datasets for each additional object of the plurality of additional objects.

23. The method of claim 22, wherein the comparison dataset further comprises a plurality of additional origin profiles, each of the additional origin profiles corresponding to an additional object of the plurality of additional objects.

24. The method of claim 23, wherein the additional origin profiles are determined based on the digital image data of one or more objects with a known geographic origin.

25. The method of claim 17, wherein the object comprises one or more of:
- a gemstone;
- a precious metal;
- a coin;
- a watch;
- an automobile;
- a luxury good,
- an artisanal work; and
- a simi-artisanal work.

26. The method of claim 17, further comprising:

partitioning, into two or more subsets, each of the following: one more feature variables of the object, the plurality of image datasets and the first digital image data;

determining an external consistency metric of the two or more subsets based on a comparison of one or more portions of two or more corresponding datasets in each of the different subsets;

determining an internal a consistency metric for a single subset based on a comparison of one or more portions of data within the same subset; and determining, based on a comparison of the external consistency metric and the internal consistency metric, a confidence score for one or more datasets associated with the digital image data of the first object.

27. The method of claim 17, further comprising:

generating a first origin profile of a first origin associated with the object, the first origin profile associated with one or more additional objects associated with the first origin, one or more origin profiles of one or more associated additional objects, one or more associated geographic locations, and one or more associated object categories; and determining the origin score for the first object based on at least based on a comparison of the one or more feature variables determined for the first object, the first origin profile, and the comparison dataset based on the plurality of additional objects.

28. The method of claim 27, further comprising:

determining a first object category associated with the object;

identifying a one or more additional objects associated with the first object category;

generating a second origin profile of a second origin based on the one or more objects associated with the second origin; and wherein determining the origin score for the first object is based on the first origin profile, the second origin profile, and the received comparison dataset.

29. The method of claim 17, wherein determining the origin for the object includes using a first machine-learning model.

30. The method of claim 17, further comprising:

receiving first metadata associated with the first digital image data, the first metadata including an output resolution and one or more originality identifiers indicative of an originality of the first digital image data;

determining an expected pixels per inch of the first digital image data based on the output resolution of the first metadata and the first distance;

determining an actual pixels per inch of the first digital image data based on the output resolution and a physical dimension of the object; and verifying the first distance equals an expected distance based on a comparison of the expected pixels per inch and the actual pixels per inch of the first digital image data.

* * * * *